(12) United States Patent
Binder

(10) Patent No.: US 8,000,349 B2
(45) Date of Patent: Aug. 16, 2011

(54) TELEPHONE COMMUNICATION SYSTEM OVER A SINGLE TELEPHONE LINE

(75) Inventor: Yehuda Binder, Hod HaSharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1059 days.

(21) Appl. No.: 11/781,005

(22) Filed: Jul. 20, 2007

(65) Prior Publication Data

US 2008/0013529 A1    Jan. 17, 2008

Related U.S. Application Data

(63) Continuation of application No. 11/399,512, filed on Apr. 7, 2006, now Pat. No. 7,274,688, which is a continuation of application No. 09/594,765, filed on Jun. 16, 2000, now Pat. No. 7,106,721.

(30) Foreign Application Priority Data

Apr. 18, 2000 (IL) .......................... 135744

(51) Int. Cl.
  *H04J 1/02* (2006.01)
  *H04J 3/16* (2006.01)
  *H04L 12/66* (2006.01)
  *H03H 7/30* (2006.01)

(52) U.S. Cl. ........ 370/493; 370/352; 370/419; 370/467; 375/231

(58) Field of Classification Search .......... 370/352–356, 370/419–467, 493, 503–510; 379/231
See application file for complete search history.

(56) References Cited

U.S. PATENT DOCUMENTS

| | | | |
|---|---|---|---|
| 2,264,395 A | 12/1941 | Mitchell |
| 2,264,396 A | 12/1941 | Moore |
| 2,298,435 A | 10/1942 | Tunick |
| 2,510,273 A | 6/1950 | Barstow et at |
| 2,516,211 A | 7/1950 | Hochgraf |
| 2,568,342 A | 9/1951 | Koehler et al. |
| 3,280,259 A | 10/1966 | Cotter |
| 3,366,744 A | 1/1968 | Miller |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Hasselwood et al. |

(Continued)

FOREIGN PATENT DOCUMENTS

EP    0241152 A2    10/1987

(Continued)

OTHER PUBLICATIONS

J. Hofmann, Cable, Television, and the Consumer Electronic Bus, Symposium Record, 15th International TV Symposium, Jun. 11, 1987, Montreux, Switzerland, 9 pages.

(Continued)

*Primary Examiner* — Afsar M. Qureshi
(74) *Attorney, Agent, or Firm* — Browdy and Neimark, PLLC

(57) ABSTRACT

A module and kit for coupling at least one telephone service signal to at least one telephone device over a wiring. The network includes: a wiring having at least two conductors for carrying multiple time-domain multiplexed digitized voice channels; an exchange side device coupled to the wiring and operative to couple at least one telephone service signal to at least one digitized voice channel; and at least one subscriber side device coupled to the wiring and operative to couple the at least one telephone device to at least one digitized voice channel.

66 Claims, 13 Drawing Sheets

U.S. PATENT DOCUMENTS

| | | |
|---|---|---|
| 3,723,653 A | 3/1973 | Tatsuzawa |
| 3,739,226 A | 6/1973 | Seiter et al. |
| 3,805,265 A | 4/1974 | Lester |
| 3,872,253 A | 3/1975 | Jurschak |
| 3,872,319 A | 3/1975 | Platzer, Jr. |
| 3,873,771 A | 3/1975 | Kleinerman et al. |
| 3,875,339 A | 4/1975 | Gruen et al. |
| 3,876,984 A | 4/1975 | Chertok |
| 3,937,889 A | 2/1976 | Bell, III et al. |
| 3,949,172 A | 4/1976 | Brown et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,171,467 A | 10/1979 | Evenchik |
| 4,206,320 A | 6/1980 | Keasler et al. |
| 4,302,629 A | 11/1981 | Foulkes et al. |
| 4,328,579 A | 5/1982 | Hashimoto et al. |
| 4,330,687 A | 5/1982 | Foulkes et al. |
| 4,332,980 A | 6/1982 | Reynolds et al. |
| 4,335,464 A | 6/1982 | Armstrong et al. |
| 4,339,816 A | 7/1982 | Reed |
| 4,367,548 A | 1/1983 | Cotten, Jr. et al. |
| 4,378,470 A | 3/1983 | Murto et al. |
| 4,380,009 A | 4/1983 | Long et al. |
| 4,381,427 A | 4/1983 | Cheal et al. |
| 4,387,271 A | 6/1983 | Artom |
| 4,388,489 A | 6/1983 | Wigan et al. |
| 4,390,986 A | 6/1983 | Moses |
| 4,393,508 A | 7/1983 | Boudault |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,475,193 A | 10/1984 | Brown |
| 4,479,033 A | 10/1984 | Brown et al. |
| 4,484,185 A | 11/1984 | Graves |
| 4,485,400 A | 11/1984 | Lemelson et al. |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,793 A | 3/1985 | Adams |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | Ab Der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,631,367 A | 12/1986 | Coviello et al. |
| 4,636,914 A | 1/1987 | Belli |
| 4,644,526 A | 2/1987 | Wu |
| 4,646,289 A | 2/1987 | Tsiakas et al. |
| 4,646,296 A | 2/1987 | Bartholet et al. |
| 4,647,725 A | 3/1987 | Dellinger et al. |
| 4,649,551 A | 3/1987 | Sander et al. |
| 4,651,022 A | 3/1987 | Cowley |
| 4,656,655 A | 4/1987 | Hashimoto |
| 4,665,516 A | 5/1987 | Middleton et al. |
| 4,665,544 A | 5/1987 | Honda et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,674,085 A | 6/1987 | Aranguren et al. |
| 4,679,227 A | 7/1987 | Hughes-Hartogs |
| 4,701,945 A | 10/1987 | Pedigo |
| 4,703,499 A | 10/1987 | Fossas et al. |
| 4,709,412 A | 11/1987 | Seymour et al. |
| 4,731,821 A | 3/1988 | Jackson, III |
| 4,734,932 A | 3/1988 | Lott |
| 4,740,963 A | 4/1988 | Eckley |
| 4,748,656 A | 5/1988 | Gibbs et al. |
| 4,750,094 A | 6/1988 | Krasik |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,787,082 A | 11/1988 | Delaney et al. |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,814,941 A | 3/1989 | Speet et al. |
| 4,821,319 A | 4/1989 | Middleton et al. |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,847,903 A | 7/1989 | Schotz |
| 4,849,811 A | 7/1989 | Kleinerman |
| 4,852,151 A | 7/1989 | Dittakavi et al. |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,891,694 A | 1/1990 | Way |
| 4,893,326 A | 1/1990 | Duran et al. |
| 4,896,349 A | 1/1990 | Kubo et al. |
| 4,901,342 A | 2/1990 | Jones |
| 4,903,292 A | 2/1990 | Dillon |
| 4,914,688 A | 4/1990 | Kobayashi et al. |
| 4,918,688 A | 4/1990 | Krause et al. |
| 4,924,349 A | 5/1990 | Buehler et al. |
| 4,924,492 A | 5/1990 | Gitlin et al. |
| 4,932,022 A | 6/1990 | Keeney et al. |
| 4,932,047 A | 6/1990 | Emmons et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |
| 5,022,069 A | 6/1991 | Chen |
| 5,023,868 A | 6/1991 | Davidson et al. |
| 5,027,426 A | 6/1991 | Chiocca, Jr. |
| 5,034,948 A | 7/1991 | Mizutani et al. |
| 5,036,513 A | 7/1991 | Greenblatt |
| 5,042,028 A | 8/1991 | Ogawa |

| Patent | Date | Inventor |
|---|---|---|
| 5,051,822 A | 9/1991 | Rhoades |
| 5,066,939 A | 11/1991 | Mansfield, Jr. |
| 5,070,522 A | 12/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,111,497 A | 5/1992 | Bliven et al. |
| 5,114,365 A | 5/1992 | Thompson et al. |
| 5,127,003 A | 6/1992 | Doll, Jr. et al. |
| 5,140,630 A | 8/1992 | Fry et al. |
| 5,142,568 A | 8/1992 | Ogata et al. |
| 5,151,838 A | 9/1992 | Dockery |
| 5,192,231 A | 3/1993 | Dolin, Jr. |
| 5,247,347 A | 9/1993 | Litteral et al. |
| 5,257,006 A | 10/1993 | Graham et al. |
| 5,265,154 A | 11/1993 | Schotz |
| 5,283,637 A | 2/1994 | Goolcharan |
| 5,283,825 A | 2/1994 | Druckman et al. |
| 5,305,312 A | 4/1994 | Fornek et al. |
| 5,319,634 A | 6/1994 | Bartholomew et al. |
| 5,341,415 A | 8/1994 | Baran |
| 5,345,437 A | 9/1994 | Ogawa |
| 5,353,334 A | 10/1994 | O'Sullivan |
| 5,363,432 A | 11/1994 | Martin et al. |
| 5,379,005 A | 1/1995 | Aden et al. |
| 5,381,459 A | 1/1995 | Lappington |
| 5,381,462 A | 1/1995 | Larson et al. |
| 5,402,902 A | 4/1995 | Bouley |
| 5,408,260 A | 4/1995 | Arnon |
| 5,410,343 A | 4/1995 | Coddington et al. |
| 5,425,089 A | 6/1995 | Chan et al. |
| 5,428,608 A | 6/1995 | Freeman et al. |
| 5,440,335 A | 8/1995 | Beveridge |
| 5,452,289 A | 9/1995 | Sharma et al. |
| 5,463,616 A | 10/1995 | Kruse et al. |
| 5,471,190 A | 11/1995 | Zimmermann |
| 5,473,517 A | 12/1995 | Blackman |
| 5,473,613 A | 12/1995 | Bliven |
| 5,479,447 A | 12/1995 | Chow et al. |
| 5,489,894 A | 2/1996 | Murray |
| 5,499,241 A | 3/1996 | Thompson et al. |
| 5,500,794 A | 3/1996 | Fujita et al. |
| 5,513,251 A | 4/1996 | Rochkind et al. |
| 5,519,731 A | 5/1996 | Cioffi |
| 5,530,737 A | 6/1996 | Bartholomew et al. |
| 5,533,101 A | 7/1996 | Miyagawa |
| 5,534,912 A | 7/1996 | Kostreski |
| 5,539,821 A | 7/1996 | Blonder |
| 5,548,592 A | 8/1996 | Komarek et al. |
| 5,550,836 A | 8/1996 | Albrecht et al. |
| 5,550,900 A | 8/1996 | Ensor et al. |
| 5,553,063 A | 9/1996 | Dickson |
| 5,557,612 A | 9/1996 | Bingham |
| 5,563,782 A | 10/1996 | Chen et al. |
| 5,569,209 A | 10/1996 | Roitman |
| 5,570,355 A | 10/1996 | Dail et al. |
| 5,574,256 A | 11/1996 | Cottone |
| 5,581,555 A | 12/1996 | Dubberly et al. |
| 5,587,692 A | 12/1996 | Graham et al. |
| 5,590,173 A | 12/1996 | Beasley |
| 5,592,540 A | 1/1997 | Beveridge |
| 5,594,726 A | 1/1997 | Thompson et al. |
| 5,594,789 A | 1/1997 | Seazholtz et al. |
| 5,596,631 A | 1/1997 | Chen |
| 5,608,447 A | 3/1997 | Farry et al. |
| 5,608,725 A | 3/1997 | Grube et al. |
| 5,610,916 A | 3/1997 | Kostreski et al. |
| 5,610,922 A | 3/1997 | Balatoni |
| 5,613,190 A | 3/1997 | Hylton |
| 5,613,191 A | 3/1997 | Hylton |
| 5,619,505 A | 4/1997 | Grube et al. |
| 5,621,455 A | 4/1997 | Rogers et al. |
| 5,623,537 A | 4/1997 | Ensor et al. |
| 5,625,651 A | 4/1997 | Cioffi |
| 5,625,677 A | 4/1997 | Feiertag et al. |
| 5,625,863 A | 4/1997 | Abraham |
| 5,627,501 A | 5/1997 | Biran et al. |
| 5,627,833 A | 5/1997 | Bliven |
| 5,646,983 A | 7/1997 | Suffern et al. |
| 5,668,814 A | 9/1997 | Balatoni |
| 5,668,857 A | 9/1997 | McHale |
| 5,673,290 A | 9/1997 | Cioffi |
| 5,675,375 A | 10/1997 | Riffee |
| 5,682,386 A | 10/1997 | Arimilli et al. |
| 5,696,790 A | 12/1997 | Graham et al. |
| 5,699,413 A | 12/1997 | Sridhar |
| 5,705,974 A | 1/1998 | Patel et al. |
| 5,708,701 A | 1/1998 | Houvig et al. |
| 5,708,705 A | 1/1998 | Yamashita et al. |
| 5,712,614 A | 1/1998 | Patel et al. |
| 5,712,977 A | 1/1998 | Glad et al. |
| 5,729,824 A | 3/1998 | O'Neill et al. |
| 5,736,965 A | 4/1998 | Mosebrook et al. |
| 5,737,333 A | 4/1998 | Civanlar et al. |
| 5,751,701 A | 5/1998 | Langberg et al. |
| 5,756,280 A | 5/1998 | Soora et al. |
| 5,757,803 A | 5/1998 | Russell et al. |
| 5,764,743 A | 6/1998 | Goedken et al. |
| 5,767,895 A | 6/1998 | Yashiro et al. |
| 5,768,279 A | 6/1998 | Barn et al. |
| 5,771,232 A | 6/1998 | Sinibaldi et al. |
| 5,771,236 A | 6/1998 | Sansom et al. |
| 5,774,526 A | 6/1998 | Propp et al. |
| 5,778,303 A | 7/1998 | Shinozaki et al. |
| 5,781,617 A | 7/1998 | McHale et al. |
| 5,781,622 A | 7/1998 | Ben-Zion |
| 5,787,115 A | 7/1998 | Turnball et al. |
| 5,790,548 A | 8/1998 | Sistanizadeh et al. |
| 5,793,413 A | 8/1998 | Hylton et al. |
| 5,801,635 A | 9/1998 | Price |
| 5,802,177 A | 9/1998 | Daniel et al. |
| 5,802,283 A | 9/1998 | Grady et al. |
| 5,805,591 A | 9/1998 | Naboulsi et al. |
| 5,809,033 A | 9/1998 | Turner et al. |
| 5,809,431 A | 9/1998 | Bustamante et al. |
| 5,812,786 A | 9/1998 | Seazholtz et al. |
| 5,822,374 A | 10/1998 | Levin |
| 5,822,678 A | 10/1998 | Evanyk |
| 5,826,196 A | 10/1998 | Cuthrell |
| 5,828,821 A | 10/1998 | Hoshina et al. |
| 5,832,057 A | 11/1998 | Furman |
| 5,833,350 A | 11/1998 | Moreland |
| 5,838,777 A | 11/1998 | Chang et al. |
| 5,841,360 A | 11/1998 | Binder |
| 5,841,840 A | 11/1998 | Smith et al. |
| 5,841,841 A | 11/1998 | Dodds et al. |
| 5,848,054 A | 12/1998 | Mosebrook et al. |
| 5,848,150 A | 12/1998 | Bingel |
| 5,878,047 A | 3/1999 | Ganek et al. |
| 5,881,142 A | 3/1999 | Frankel et al. |
| 5,886,732 A | 3/1999 | Humpleman |
| 5,889,765 A | 3/1999 | Gibbs |
| 5,889,856 A | 3/1999 | O'Toole et al. |
| 5,895,985 A | 4/1999 | Fischer |
| 5,896,443 A | 4/1999 | Dichter |
| 5,896,556 A | 4/1999 | Moreland et al. |
| 5,898,761 A | 4/1999 | McHale et al. |
| 5,903,572 A | 5/1999 | Wright et al. |
| 5,905,781 A | 5/1999 | McHale et al. |
| 5,905,786 A | 5/1999 | Hoopes |
| 5,910,970 A | 6/1999 | Lu |
| 5,911,119 A | 6/1999 | Bartholomew et al. |
| 5,911,123 A | 6/1999 | Shaffer et al. |
| 5,912,895 A | 6/1999 | Terry et al. |
| 5,917,814 A | 6/1999 | Balatoni |
| 5,926,479 A | 7/1999 | Baran |
| 5,930,340 A | 7/1999 | Bell |
| 5,936,952 A | 8/1999 | Lecomte |
| 5,936,963 A | 8/1999 | Saussy |
| 5,937,055 A | 8/1999 | Kaplan |
| 5,940,738 A | 8/1999 | Rao |
| 5,949,476 A | 9/1999 | Pocock et al. |
| 5,956,323 A | 9/1999 | Bowie |
| 5,960,066 A | 9/1999 | Hartman et al. |
| 5,963,539 A | 10/1999 | Webber, Jr. et al. |
| 5,963,595 A | 10/1999 | Graham et al. |
| 5,963,620 A | 10/1999 | Frankel et al. |
| 5,968,118 A | 10/1999 | Sutton, Jr. |

| | | | | | | |
|---|---|---|---|---|---|---|
| 5,970,127 | A | 10/1999 | Smith et al. | 6,195,706 B1 | 2/2001 | Scott |
| 5,982,784 | A | 11/1999 | Bell | 6,202,211 B1 | 3/2001 | Williams, Jr. |
| 5,982,854 | A | 11/1999 | Ehreth | 6,205,202 B1 | 3/2001 | Yoshida et al. |
| 5,987,061 | A | 11/1999 | Chen | 6,207,895 B1 | 3/2001 | Engel |
| 5,991,311 | A | 11/1999 | Long et al. | 6,208,637 B1 | 3/2001 | Eames |
| 5,995,598 | A | 11/1999 | Berstis | 6,212,204 B1 | 4/2001 | Depue |
| 5,999,518 | A | 12/1999 | Nattkemper et al. | 6,212,227 B1 | 4/2001 | Ko et al. |
| 5,999,612 | A | 12/1999 | Dunn et al. | 6,215,789 B1 | 4/2001 | Keenan |
| 6,002,682 | A | 12/1999 | Bellenger et al. | 6,215,799 B1 | 4/2001 | Mitchell et al. |
| 6,002,722 | A | 12/1999 | Wu | 6,215,855 B1 | 4/2001 | Schneider |
| 6,005,873 | A | 12/1999 | Amit | 6,216,160 B1 | 4/2001 | Dichter |
| 6,009,041 | A | 12/1999 | Rolandi et al. | 6,222,124 B1 | 4/2001 | Pritchard et al. |
| 6,010,228 | A | 1/2000 | Blackman et al. | 6,222,853 B1 | 4/2001 | Marttinen et al. |
| 6,011,781 | A | 1/2000 | Bell | 6,229,818 B1 | 5/2001 | Bell |
| 6,011,910 | A | 1/2000 | Chau et al. | 6,236,653 B1 | 5/2001 | Dalton et al. |
| 6,014,386 | A | 1/2000 | Abraham | 6,239,672 B1 | 5/2001 | Lutz, Jr. et al. |
| 6,014,431 | A | 1/2000 | McHale et al. | 6,240,091 B1 | 5/2001 | Ginzboorg et al. |
| 6,021,158 | A | 2/2000 | Schurr et al. | 6,240,166 B1 | 5/2001 | Collin et al. |
| 6,026,150 | A | 2/2000 | Frank | 6,243,394 B1 | 6/2001 | Deng |
| 6,026,160 | A | 2/2000 | Staber et al. | 6,243,571 B1 | 6/2001 | Bullock et al. |
| 6,028,867 | A | 2/2000 | Rawson et al. | 6,246,695 B1 | 6/2001 | Seazholtz et al. |
| 6,029,047 | A | 2/2000 | Ishida et al. | 6,246,716 B1 | 6/2001 | Schneider |
| 6,032,057 | A | 2/2000 | Kiiski | 6,252,754 B1 | 6/2001 | Chaudhry |
| 6,038,300 | A | 3/2000 | Hartmann et al. | 6,252,755 B1 | 6/2001 | Willer |
| 6,038,425 | A | 3/2000 | Jeffrey | 6,259,676 B1 | 7/2001 | Kellock et al. |
| 6,040,759 | A | 3/2000 | Sanderson | 6,259,775 B1 | 7/2001 | Alpert et al. |
| 6,046,995 | A | 4/2000 | Turnbull et al. | 6,266,348 B1 | 7/2001 | Gross et al. |
| 6,047,055 | A | 4/2000 | Carkner et al. | 6,272,209 B1 | 8/2001 | Bridger et al. |
| 6,049,531 | A | 4/2000 | Roy | 6,272,219 B1 | 8/2001 | De Bruycker et al. |
| 6,052,380 | A | 4/2000 | Bell | 6,278,769 B1 | 8/2001 | Bella |
| 6,055,242 | A | 4/2000 | Doshi et al. | 6,282,075 B1 | 8/2001 | Chaudhry |
| 6,055,268 | A | 4/2000 | Timm et al. | 6,286,049 B1 | 9/2001 | Rajakarunanayake et al. |
| 6,061,261 | A | 5/2000 | Chen et al. | 6,288,334 B1 | 9/2001 | Hennum |
| 6,061,357 | A | 5/2000 | Olshansky et al. | 6,292,467 B1 | 9/2001 | Keller |
| 6,061,392 | A | 5/2000 | Bremer et al. | 6,292,517 B1 | 9/2001 | Jeffress et al. |
| 6,064,422 | A | 5/2000 | Goolcharan et al. | 6,297,450 B1 | 10/2001 | Yu |
| 6,069,879 | A | 5/2000 | Chatter | 6,298,037 B1 | 10/2001 | Sharifi |
| 6,069,890 | A | 5/2000 | White et al. | 6,301,337 B1 | 10/2001 | Scholtz et al. |
| 6,069,899 | A | 5/2000 | Foley | 6,310,894 B1 | 10/2001 | Counterman |
| 6,072,779 | A | 6/2000 | Tzannes et al. | 6,310,909 B1 | 10/2001 | Jones |
| 6,072,810 | A | 6/2000 | Van der Putten et al. | 6,310,940 B1 | 10/2001 | Ratz |
| 6,075,784 | A | 6/2000 | Frankel et al. | 6,314,102 B1 | 11/2001 | Czerwiec et al. |
| 6,075,787 | A | 6/2000 | Bobeck et al. | 6,317,884 B1 | 11/2001 | Eames et al. |
| 6,081,519 | A | 6/2000 | Petler | 6,320,900 B1 | 11/2001 | Liu |
| 6,087,860 | A | 7/2000 | Liu et al. | 6,324,167 B1 | 11/2001 | Starr |
| 6,088,368 | A | 7/2000 | Rubinstain et al. | 6,324,268 B1 | 11/2001 | Balachandran et al. |
| 6,091,932 | A | 7/2000 | Langlais | 6,329,937 B1 | 12/2001 | Harman |
| 6,094,441 | A | 7/2000 | Jung et al. | 6,334,219 B1 | 12/2001 | Hill et al. |
| 6,097,801 | A | 8/2000 | Williams et al. | 6,339,594 B1 | 1/2002 | Civanlar et al. |
| 6,101,341 | A | 8/2000 | Manabe | 6,345,047 B1 | 2/2002 | Regnier |
| 6,107,912 | A | 8/2000 | Bullock et al. | 6,346,964 B1 | 2/2002 | Rogers et al. |
| 6,108,331 | A | 8/2000 | Thompson | 6,347,075 B1 | 2/2002 | Barzegar et al. |
| 6,111,595 | A | 8/2000 | Hertrich | 6,349,098 B1 | 2/2002 | Parruck et al. |
| 6,111,936 | A | 8/2000 | Bremer | 6,349,133 B1 | 2/2002 | Matthews et al. |
| 6,114,970 | A | 9/2000 | Kirson et al. | 6,353,629 B1 | 3/2002 | Pal |
| 6,115,755 | A | 9/2000 | Krishan | 6,359,906 B1 | 3/2002 | Dyke et al. |
| 6,120,262 | A | 9/2000 | McDonough et al. | 6,362,987 B1 | 3/2002 | Yurek et al. |
| 6,123,577 | A | 9/2000 | Contois et al. | 6,364,535 B1 | 4/2002 | Coffey |
| 6,128,471 | A | 10/2000 | Quelch et al. | 6,370,149 B1 | 4/2002 | Gorman et al. |
| 6,130,879 | A | 10/2000 | Liu | 6,380,852 B1 | 4/2002 | Hartman et al. |
| 6,130,893 | A | 10/2000 | Whittaker et al. | 6,385,203 B2 | 5/2002 | McHale et al. |
| 6,134,308 | A | 10/2000 | Fallon et al. | 6,388,990 B1 | 5/2002 | Wetzel |
| 6,137,865 | A | 10/2000 | Ripy et al. | 6,389,110 B1 | 5/2002 | Fischer et al. |
| 6,137,866 | A | 10/2000 | Staber et al. | 6,389,125 B1 | 5/2002 | Ubowski |
| 6,141,330 | A | 10/2000 | Akers | 6,393,050 B1 | 5/2002 | Liu |
| 6,141,339 | A | 10/2000 | Kaplan et al. | 6,396,391 B1 | 5/2002 | Binder |
| 6,141,356 | A | 10/2000 | Gorman | 6,396,393 B2 | 5/2002 | Yuasa |
| 6,144,399 | A | 11/2000 | Manchester et al. | 6,396,837 B1 | 5/2002 | Wang et al. |
| 6,148,006 | A | 11/2000 | Dyke et al. | 6,400,815 B1 | 6/2002 | Gilboy et al. |
| 6,151,333 | A | 11/2000 | Arimilli et al. | 6,404,773 B1 | 6/2002 | Williams et al. |
| 6,157,292 | A | 12/2000 | Piercy et al. | 6,404,861 B1 | 6/2002 | Cohen et al. |
| 6,161,134 | A | 12/2000 | Wang et al. | 6,405,027 B1 | 6/2002 | Bell |
| 6,167,043 | A | 12/2000 | Frantz | 6,414,952 B2 | 7/2002 | Foley |
| 6,178,161 | B1 | 1/2001 | Terry | 6,420,964 B1 | 7/2002 | Nishikawa et al. |
| 6,181,715 | B1 | 1/2001 | Phillips et al. | 6,424,661 B1 | 7/2002 | Bentley |
| 6,181,775 | B1 | 1/2001 | Bella | 6,426,942 B1 | 7/2002 | Sienel et al. |
| 6,186,826 | B1 | 2/2001 | Weikle | 6,427,237 B1 | 7/2002 | Aranguren et al. |
| 6,188,557 | B1 | 2/2001 | Chaudhry | 6,430,199 B1 | 8/2002 | Kerpez |
| 6,192,399 | B1 | 2/2001 | Goodman | 6,433,672 B1 | 8/2002 | Shirmard |

| | | |
|---|---|---|
| 6,434,123 B1 | 8/2002 | Park |
| 6,438,109 B1 | 8/2002 | Karaoguz et al. |
| 6,441,723 B1 | 8/2002 | Mansfield, Jr. et al. |
| 6,442,195 B1 | 8/2002 | Liu et al. |
| 6,445,087 B1 | 9/2002 | Wang et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,714 B2 | 9/2002 | Shima et al. |
| 6,459,692 B1 | 10/2002 | Ben-Michael et al. |
| 6,466,572 B1 | 10/2002 | Ethridge et al. |
| 6,470,053 B1 | 10/2002 | Liu |
| 6,473,495 B1 | 10/2002 | Willer |
| 6,474,829 B2 | 11/2002 | Clodfelter |
| 6,477,595 B1 | 11/2002 | Cohen et al. |
| 6,480,510 B1 | 11/2002 | Binder |
| 6,481,013 B1 | 11/2002 | Dinwiddie et al. |
| 6,483,902 B1 | 11/2002 | Stewart et al. |
| 6,483,903 B1 | 11/2002 | Itay et al. |
| 6,490,273 B1 | 12/2002 | DeNap et al. |
| 6,492,897 B1 | 12/2002 | Mowery et al. |
| 6,493,875 B1 | 12/2002 | Eames et al. |
| 6,518,724 B2 | 2/2003 | Janik |
| 6,519,250 B1 | 2/2003 | Fan |
| 6,519,291 B1 | 2/2003 | Dagdeviren et al. |
| 6,522,352 B1 | 2/2003 | Strandwitz et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,539,011 B1 | 3/2003 | Keenan et al. |
| 6,539,081 B2 | 3/2003 | Zakrzewski et al. |
| 6,542,465 B1 | 4/2003 | Wang |
| 6,543,940 B2 | 4/2003 | Chu |
| 6,546,024 B1 | 4/2003 | Sharper et al. |
| 6,546,098 B1 | 4/2003 | Henderson |
| 6,549,616 B1 | 4/2003 | Binder |
| 6,556,564 B2 | 4/2003 | Rogers |
| 6,556,581 B1 | 4/2003 | He et al. |
| 6,560,225 B1 | 5/2003 | Czajkowski et al. |
| 6,560,319 B1 | 5/2003 | Binder |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,580,710 B1 | 6/2003 | Bowen et al. |
| 6,580,727 B1 | 6/2003 | Yim et al. |
| 6,580,785 B2 | 6/2003 | Bremer et al. |
| 6,584,122 B1 | 6/2003 | Matthews et al. |
| 6,584,148 B1 | 6/2003 | Zitting et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,597,732 B1 | 7/2003 | Dowling |
| 6,600,734 B1 | 7/2003 | Gernert et al. |
| 6,601,097 B1 | 7/2003 | Cheston et al. |
| 6,603,808 B1 | 8/2003 | Anne et al. |
| 6,608,894 B1 | 8/2003 | Armenta |
| 6,611,537 B1 | 8/2003 | Edens et al. |
| 6,636,505 B1 | 10/2003 | Wang et al. |
| 6,639,913 B1 | 10/2003 | Frankel et al. |
| 6,653,932 B1 | 11/2003 | Beamish et al. |
| 6,657,994 B1 | 12/2003 | Rajakarunanayake |
| 6,674,843 B1 | 1/2004 | Ham |
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,686,832 B2 | 2/2004 | Abraham |
| 6,690,677 B1 | 2/2004 | Binder |
| 6,693,916 B1 | 2/2004 | Chaplik et al. |
| 6,697,358 B2 | 2/2004 | Berstein |
| 6,700,970 B1 | 3/2004 | Aronson et al. |
| 6,701,406 B1 | 3/2004 | Chang et al. |
| 6,704,414 B2 | 3/2004 | Murakoshi |
| 6,710,553 B2 | 3/2004 | Logan |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,744,883 B1 | 6/2004 | Bingel et al. |
| 6,747,859 B2 | 6/2004 | Walbeck et al. |
| 6,747,995 B1 | 6/2004 | Brown et al. |
| 6,747,996 B2 | 6/2004 | Holloway et al. |
| 6,751,212 B1 | 6/2004 | Kaji et al. |
| 6,754,186 B1 | 6/2004 | Bullman |
| 6,754,235 B2 | 6/2004 | Van Der Putten et al. |
| 6,757,382 B1 | 6/2004 | Wilkes, Jr. et al. |
| 6,760,384 B1 | 7/2004 | Garreau et al. |
| 6,763,097 B1 | 7/2004 | Yitenberg |
| 6,765,149 B1 | 7/2004 | Ku |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,269 B1 | 8/2004 | Kaczmarczyk et al. |
| 6,778,549 B1 | 8/2004 | Keller |
| 6,778,646 B1 | 8/2004 | Sun |
| 6,778,817 B1 | 8/2004 | Bullock et al. |
| 6,785,296 B1 | 8/2004 | Bell |
| 6,792,323 B2 | 9/2004 | Krzyzanowski et al. |
| 6,798,767 B1 | 9/2004 | Alexander et al. |
| 6,813,343 B1 | 11/2004 | Vitenberg |
| 6,816,512 B1 | 11/2004 | Lazarus et al. |
| 6,819,760 B1 | 11/2004 | Nayler |
| 6,823,047 B1 | 11/2004 | Cruickshank |
| 6,826,174 B1 | 11/2004 | Erekson et al. |
| 6,831,975 B1 | 12/2004 | Easwaran et al. |
| 6,836,546 B1 | 12/2004 | Willer |
| 6,838,997 B1 | 1/2005 | Davidson |
| 6,839,345 B2 | 1/2005 | Lu et al. |
| 6,842,426 B2 | 1/2005 | Bogardus et al. |
| 6,842,459 B1 | 1/2005 | Binder |
| 6,847,718 B1 | 1/2005 | Hiraoka |
| 6,853,724 B2 | 2/2005 | Wang |
| 6,854,895 B2 | 2/2005 | Coffey et al. |
| 6,856,616 B1 | 2/2005 | Schuster et al. |
| 6,856,799 B1 | 2/2005 | Ritter |
| 6,862,353 B2 | 3/2005 | Rabenko et al. |
| 6,864,798 B2 | 3/2005 | Janik |
| 6,865,193 B2 | 3/2005 | Terk |
| 6,868,072 B1 | 3/2005 | Lin et al. |
| 6,868,081 B1 | 3/2005 | Akram et al. |
| 6,868,117 B1 | 3/2005 | Mardinian |
| 6,868,265 B2 | 3/2005 | Zodnik |
| 6,880,020 B1 | 4/2005 | Rubinstein et al. |
| 6,882,714 B2 | 4/2005 | Mansfield |
| 6,886,181 B1 | 4/2005 | Dodds et al. |
| 6,888,459 B2 | 5/2005 | Stilp |
| 6,891,881 B2 | 5/2005 | Trachewsky et al. |
| 6,895,089 B2 | 5/2005 | Wang |
| 6,898,413 B2 | 5/2005 | Yip et al. |
| 6,901,439 B1 | 5/2005 | Bonasia et al. |
| 6,904,134 B2 | 6/2005 | Jeon et al. |
| 6,904,149 B2 | 6/2005 | Keenum et al. |

| | | |
|---|---|---|
| 6,907,458 B2 | 6/2005 | Tomassetti et al. |
| 6,909,725 B1 | 6/2005 | Chow |
| 6,912,209 B1 | 6/2005 | Thi et al. |
| 6,922,407 B2 | 7/2005 | Wu |
| 6,925,089 B2 | 8/2005 | Chow et al. |
| 6,932,624 B1 | 8/2005 | Hoopes et al. |
| 6,933,686 B1 | 8/2005 | Bishel |
| 6,934,300 B2 | 8/2005 | Tomassetti et al. |
| 6,934,754 B2 | 8/2005 | West et al. |
| 6,937,056 B2 | 8/2005 | Binder |
| 6,940,918 B1 | 9/2005 | Nayler et al. |
| 6,940,956 B1 | 9/2005 | Leach |
| 6,941,364 B2 | 9/2005 | Kim et al. |
| 6,943,296 B2 | 9/2005 | Perrella et al. |
| 6,943,683 B2 | 9/2005 | Perret |
| 6,946,988 B1 | 9/2005 | Edwards et al. |
| 6,947,736 B2 | 9/2005 | Shaver et al. |
| 6,955,560 B1 | 10/2005 | Biggs |
| 6,956,826 B1 | 10/2005 | Binder |
| 6,961,303 B1 | 11/2005 | Binder |
| 6,963,559 B2 | 11/2005 | Elo |
| 6,975,713 B1 | 12/2005 | Smith et al. |
| 6,980,638 B1 | 12/2005 | Smith et al. |
| 6,981,892 B1 | 1/2006 | Kostelnik |
| 6,985,714 B2 | 1/2006 | Akiyama et al. |
| 6,989,733 B2 | 1/2006 | Simonsen et al. |
| 6,993,289 B2 | 1/2006 | Janik |
| 6,995,657 B2 | 2/2006 | Zalitzky et al. |
| 6,996,134 B1 | 2/2006 | Renucci et al. |
| 6,996,213 B1 | 2/2006 | De Jong |
| 6,996,729 B2 | 2/2006 | Volkening et al. |
| 6,998,964 B2 | 2/2006 | Lomax, Jr. et al. |
| 6,999,433 B2 | 2/2006 | Baum |
| 7,002,898 B1 | 2/2006 | Lou |
| 7,003,102 B2 | 2/2006 | Kiko |
| 7,006,445 B1 | 2/2006 | Cole et al. |
| 7,009,946 B1 | 3/2006 | Kardach |
| 7,010,002 B2 | 3/2006 | Chow et al. |
| 7,012,922 B1 | 3/2006 | Unitt et al. |
| 7,016,377 B1 | 3/2006 | Chun et al. |
| 7,020,130 B2 | 3/2006 | Krause et al. |
| 7,023,809 B1 | 4/2006 | Rubinstein et al. |
| 7,027,483 B2 | 4/2006 | Santhoff et al. |
| 7,031,394 B2 | 4/2006 | Vitenberg |
| 7,034,225 B2 | 4/2006 | Thompson et al. |
| 7,035,270 B2 | 4/2006 | Moore, Jr. et al. |
| 7,046,618 B2 | 5/2006 | Santhoff et al. |
| 7,050,546 B1 | 5/2006 | Richardson et al. |
| 7,054,303 B2 | 5/2006 | Miyazaki et al. |
| 7,054,442 B2 | 5/2006 | Weikle |
| 7,058,174 B2 | 6/2006 | Posthuma |
| 7,068,649 B2 | 6/2006 | Fisher et al. |
| 7,068,682 B2 | 6/2006 | Campbell et al. |
| 7,085,238 B2 | 8/2006 | McBeath |
| 7,088,238 B2 | 8/2006 | Karaoguz et al. |
| 7,095,849 B2 | 8/2006 | Smith et al. |
| 7,099,368 B2 | 8/2006 | Santhoff et al. |
| 7,106,721 B1 | 9/2006 | Binder |
| 7,113,574 B1 | 9/2006 | Haas et al. |
| 7,116,685 B2 | 10/2006 | Brown et al. |
| 7,117,520 B2 | 10/2006 | Stewart |
| 7,133,423 B1 | 11/2006 | Chow et al. |
| 7,142,560 B2 | 11/2006 | Mansfield |
| 7,142,563 B1 | 11/2006 | Lin |
| 7,142,934 B2 | 11/2006 | Janik |
| 7,145,996 B2 | 12/2006 | Creamer et al. |
| 7,149,182 B1 | 12/2006 | Renucci et al. |
| 7,149,474 B1 | 12/2006 | Mikhak |
| 7,154,996 B2 | 12/2006 | Strauss |
| 7,162,013 B2 | 1/2007 | Gavette et al. |
| 7,164,690 B2 | 1/2007 | Limb et al. |
| 7,167,923 B2 | 1/2007 | Lo |
| 7,190,716 B2 | 3/2007 | Norrell et al. |
| 7,194,639 B2 | 3/2007 | Atkinson et al. |
| 7,209,945 B2 | 4/2007 | Hicks, III et al. |
| 7,215,763 B1 | 5/2007 | Keller et al. |
| 7,239,627 B2 | 7/2007 | Nattkemper et al. |
| 7,239,628 B1 | 7/2007 | Pendleton et al. |
| 7,256,704 B2 | 8/2007 | Yoon et al. |
| 7,257,106 B2 | 8/2007 | Chen et al. |
| 7,263,362 B1 | 8/2007 | Young et al. |
| 7,274,669 B2 | 9/2007 | Czerwiec et al. |
| 7,283,554 B2 | 10/2007 | Ophir et al. |
| 7,292,859 B2 | 11/2007 | Park |
| 7,293,103 B1 | 11/2007 | Lin et al. |
| 7,301,940 B1 | 11/2007 | Bernstein |
| 7,305,006 B1 | 12/2007 | Bella |
| 7,308,086 B2 | 12/2007 | Yoshitani |
| 7,327,765 B1 | 2/2008 | Ojard |
| 7,340,051 B2 | 3/2008 | Phillips et al. |
| 7,346,071 B2 | 3/2008 | Bareis |
| 7,382,786 B2 | 6/2008 | Chen et al. |
| 7,408,949 B2 | 8/2008 | Baum |
| 2001/0030470 A1 | 10/2001 | Waugh et al. |
| 2001/0038635 A1 | 11/2001 | Rogers |
| 2001/0047418 A1 | 11/2001 | White |
| 2002/0006137 A1 | 1/2002 | Rabenko et al. |
| 2002/0035624 A1 | 3/2002 | Kim |
| 2002/0038153 A1 | 3/2002 | Amodeo et al. |
| 2002/0039388 A1 | 4/2002 | Smart et al. |
| 2002/0063924 A1 | 5/2002 | Kimbrough et al. |
| 2002/0095662 A1 | 7/2002 | Ashlock et al. |
| 2002/0104009 A1 | 8/2002 | Zodnik |
| 2002/0114325 A1 | 8/2002 | Dale et al. |
| 2002/0128009 A1 | 9/2002 | Boch et al. |
| 2002/0131422 A1 | 9/2002 | Chu et al. |
| 2002/0144159 A1 | 10/2002 | Wu et al. |
| 2002/0150100 A1 | 10/2002 | White et al. |
| 2002/0154629 A1 | 10/2002 | Lohman et al. |
| 2002/0166125 A1 | 11/2002 | Fulmer |
| 2002/0176567 A1 | 11/2002 | Chen et al. |
| 2002/0194383 A1 | 12/2002 | Cohen |
| 2002/0194605 A1 | 12/2002 | Cohen |
| 2002/0198952 A1 | 12/2002 | Bell |
| 2003/0016794 A1 | 1/2003 | Brothers |
| 2003/0026247 A1 | 2/2003 | Bernstein |
| 2003/0039257 A1 | 2/2003 | Manis et al. |
| 2003/0048895 A1 | 3/2003 | Kiko et al. |
| 2003/0062990 A1 | 4/2003 | Schaeffer et al. |
| 2003/0067910 A1 | 4/2003 | Razazian et al. |
| 2003/0099228 A1 | 5/2003 | Alcock |
| 2003/0112965 A1 | 6/2003 | McNamara et al. |
| 2003/0133476 A1 | 7/2003 | Stone et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0198246 A1 | 10/2003 | Lifshitz et al. |
| 2003/0198341 A1 | 10/2003 | Smith et al. |
| 2004/0013098 A1 | 1/2004 | Tseng et al. |
| 2004/0037317 A1 | 2/2004 | Zalitzky et al. |
| 2004/0073597 A1 | 4/2004 | Caveney et al. |
| 2004/0083262 A1 | 4/2004 | Trantow |
| 2004/0087214 A1 | 5/2004 | Cho |
| 2004/0090984 A1 | 5/2004 | Saint-Hilaire et al. |
| 2004/0107299 A1 | 6/2004 | Lee et al. |
| 2004/0121648 A1 | 6/2004 | Voros |
| 2004/0136384 A1 | 7/2004 | Cho |
| 2004/0147232 A1 | 7/2004 | Zodnik |
| 2004/0156513 A1 | 8/2004 | Kaylor et al. |
| 2004/0170262 A1 | 9/2004 | Ohno |
| 2004/0172658 A1 | 9/2004 | Rakib et al. |
| 2004/0180573 A1 | 9/2004 | Chen |
| 2004/0198236 A1 | 10/2004 | Paine et al. |
| 2004/0204017 A1 | 10/2004 | Eckel et al. |
| 2004/0204040 A1 | 10/2004 | Heijnen |
| 2004/0208167 A1 | 10/2004 | Kishida |
| 2004/0250273 A1 | 12/2004 | Swix et al. |
| 2004/0268160 A1 | 12/2004 | Atkinson et al. |
| 2005/0018766 A1 | 1/2005 | Iwamura |
| 2005/0038875 A1 | 2/2005 | Park |
| 2005/0047379 A1 | 3/2005 | Boyden et al. |
| 2005/0053087 A1 | 3/2005 | Pulyk |
| 2005/0073968 A1 | 4/2005 | Perlman |
| 2005/0076148 A1 | 4/2005 | Chan et al. |
| 2005/0076149 A1 | 4/2005 | McKown et al. |
| 2005/0086389 A1 | 4/2005 | Chang |
| 2005/0086694 A1 | 4/2005 | Hicks et al. |
| 2005/0111491 A1 | 5/2005 | Caveney |

| | | | |
|---|---|---|---|
| 2005/0114325 A1 | 5/2005 | Liu et al. | |
| 2005/0125083 A1 | 6/2005 | Kiko | |
| 2005/0136972 A1 | 6/2005 | Smith et al. | |
| 2005/0141431 A1 | 6/2005 | Caveney et al. | |
| 2005/0150100 A1 | 7/2005 | Merdan et al. | |
| 2005/0152306 A1 | 7/2005 | Bonnassieux et al. | |
| 2005/0152323 A1 | 7/2005 | Bonnassieux et al. | |
| 2005/0152337 A1 | 7/2005 | Wurtzel et al. | |
| 2005/0177640 A1 | 8/2005 | Rubinstein et al. | |
| 2005/0184915 A1 | 8/2005 | Nagel et al. | |
| 2005/0208825 A1 | 9/2005 | Chan | |
| 2005/0226200 A1 | 10/2005 | Askildsen et al. | |
| 2005/0228889 A1 | 10/2005 | Cohen et al. | |
| 2005/0245127 A1 | 11/2005 | Nordin et al. | |
| 2005/0272372 A1 | 12/2005 | Rodriguez | |
| 2005/0273790 A1 | 12/2005 | Kearney et al. | |
| 2005/0281326 A1 | 12/2005 | Yu | |
| 2006/0006817 A1 | 1/2006 | Chason et al. | |
| 2006/0029210 A1 | 2/2006 | Feugere | |
| 2006/0047800 A1 | 3/2006 | Caveney et al. | |
| 2006/0072621 A1 | 4/2006 | Macaluso et al. | |
| 2006/0079969 A1 | 4/2006 | Seguin | |
| 2006/0104291 A1 | 5/2006 | Rodriguez et al. | |
| 2006/0126617 A1 | 6/2006 | Cregg et al. | |
| 2006/0126862 A1 | 6/2006 | Andrews et al. | |
| 2006/0152344 A1 | 7/2006 | Mowery et al. | |
| 2006/0153169 A1 | 7/2006 | Koifman et al. | |
| 2006/0193310 A1 | 8/2006 | Landry et al. | |
| 2006/0193313 A1 | 8/2006 | Landry et al. | |
| 2006/0215680 A1 | 9/2006 | Camagna | |
| 2006/0238250 A1 | 10/2006 | Camagna et al. | |
| 2006/0251094 A1 | 11/2006 | Van Vleck et al. | |
| 2006/0251159 A1 | 11/2006 | Huotari et al. | |
| 2006/0251179 A1 | 11/2006 | Ghoshal | |
| 2006/0280197 A1 | 12/2006 | Stone | |
| 2006/0291493 A1 | 12/2006 | Schley-May et al. | |
| 2007/0198748 A1 | 8/2007 | Ametsitsi et al. | |
| 2008/0140565 A1 | 6/2008 | DeBenedetti et al. | |
| 2008/0153415 A1 | 6/2008 | Block et al. | |

FOREIGN PATENT DOCUMENTS

| | | | |
|---|---|---|---|
| EP | 1004222 | | 2/1999 |
| EP | 0961466 | A1 | 12/1999 |
| EP | 0987847 | A2 | 3/2000 |
| EP | 1343253 | A1 | 9/2003 |
| EP | 1605566 | A2 | 12/2003 |
| GB | 2368979 | A | 5/2002 |
| JP | 55132197 | A | 10/1980 |
| WO | WO 95/29576 | A3 | 11/1995 |
| WO | WO 97/19533 | A1 | 5/1997 |
| WO | WO 97/50193 | A1 | 12/1997 |
| WO | WO 99/09787 | A1 | 2/1999 |
| WO | WO 99/12330 | A1 | 3/1999 |
| WO | 0007322 | | 2/2000 |
| WO | WO 01/43238 | A1 | 6/2001 |
| WO | WO 02/091652 | A2 | 11/2002 |
| WO | WO 02/102019 | A2 | 12/2002 |
| WO | WO 2005/032158 | A2 | 4/2005 |

OTHER PUBLICATIONS

Grayson Evans, The CEBUs Standard User's Guide, 1st edition, May 1996, 317 pages.

Mark Hachman, Compaq to Ride the CEBus, EBN, Jan. 22, 1996, 1 page.

Home Automation Buses: Protocols Really Hit Home, EDN, Apr. 13, 1995, 9 pages.

Brian E. Markwalter, et al; CEBus Router Testing, IEEE Transactions on Consumer Electronics, Nov. 1991, vol. 37, No. 4, 8 pages.

Draft IS-60.04 Node Communications Protocol Part 6: Application Layer Specification, Rev. Apr. 18, 1996, 129 pages.

Figure 1 (Prior-Art)

Figure 2 (Prior-Art)

Figure 3 (Prior-Art)

Figure 4 (Prior-Art)

Figure 5 (Prior-Art)

Figure 6 (Prior-Art)

TELEPHONE COMMUNICATION SYSTEM OVER A SINGLE TELEPHONE LINE

CROSS-REFERENCE TO RELATED APPLICATION

This is a division of application Ser. No. 11/399,512 filed Apr. 7, 2006, itself a continuation of application Ser. No. 09/594,765, filed on Jun. 16, 2000, the disclosures of which are incorporated herein by reference.

FIELD OF THE INVENTION

The present invention relates to the field of telephony communication networks, and, more specifically, to the networking of telephone sets within a building over single telephone line.

BACKGROUND OF THE INVENTION

There is a growing need for expanded telephone communication capabilities within the home. This need is driven by two major factors: the increasing use of additional outside lines and the desirability of exchange functionality within the home, such as for intercom systems.

Telephone Wiring

An in-home telephone service usually employs two or four wires, and is accessed via telephone outlets into which the telephone sets are connected. FIG. 1 shows the wiring configuration of a prior-art telephone system 10 for a residence or other building, wired with a residential telephone line 5. The residential telephone line 5 consists of single wire pair which connects to a junction-box 16, which in turn connects to a Public Switched Telephone Network (PSTN) 18 via a cable 17a, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 KHz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new in the home. A plurality of telephones 13a and 13b connects to telephone line 5 via a plurality of telephone outlets 11a, 11b, 11c, and 11d. Each outlet has a connector (often referred to as a "jack"), denoted in FIG. 1 as 12a, 12b, 12c, and 12d, respectively. In North America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically different segments of the same paired conductors.

While network 10 exhibits serial or daisy-chained topology wherein the wiring is serialized from an outlet to the next one only, other topologies such as star, tree or any arbitrary topology may also be used. The telephone wiring system within a residence, however, is always composed of wired media: two or four copper wires, and outlets which provide direct access for connecting to these wires.

Additional Subscriber Lines

FIG. 2 illustrates a telephone network 20 in a home, where an additional subscriber line 17b is required to be added to existing line 17a. Additional line 17b comes from exchange 18 to home junction-box 16. In order to provide access to additional line 17b, a new outlet 11e must be installed. In addition, a new telephone line 6a must be installed, routed from junction box 16 to the outlet 11e. In such an installation, a telephone set 13c is connected using a cable 15c, via connectors 14c and 12e to the added subscriber line.

Alternatively, the new wiring 6a can be routed together and as part of existing wiring 5, using the same in-wall routing. In such a case, either several new telephone outlets need to be installed, or the existing outlets need to be replaced with ones employing two or more telephone connectors.

In both the cases described above, new wiring must be added. The routing and installation of such wiring is both labor-intensive and expensive. Adding the new wiring on the exterior of the wall is less expensive, but may be aesthetically undesirable.

In buildings where four wires (two pairs) have been installed, adding a second subscriber line is quick and easy. The second pair of the existing wiring is used for the second subscriber line, thus obviating the need for routing additional wires. However, the same problem of needing additional wires is encountered in this case when a third or fourth subscriber line is required. In general, additional wiring is required whenever adding a new subscriber line to a home exceeds the capacity of the existing wiring.

FIG. 2 illustrates the case where the added subscriber lines involve the use of dedicated wiring from the exchange to the home for each such added subscriber line. New technology, however, enables multiple voice channels to be carried over a single twisted-pair (local-loop). Specifically, Digital Subscriber Line (DSL) technologies are available. For example, ISDN-BRA (Integrated Services Digital Network—Basic Rate Access, commonly referred to as ISDN) can carry two voice channels over a single twisted pair, HDSL (High Bit rate Digital Subscriber Line) supports up to 16 voice channels, and HDSL2 supports up to 30 voice channel over a single twisted pair. These and other such technologies commonly employ two modems, connected to each end of the twisted pair, as shown in network 30 in FIG. 3. The pair 17 in the local loop interfaces in the exchange side with an exchange terminal unit 32, which communicates over the local loop pair to a remote terminal unit 31, located at the customer side of the cable. Remote terminal unit 31 in turn provides subscriber line interfaces 17a and 17b, connected to junction box 16. In an alternate configuration, the voice channels are multiplexed within a digital stream, such as PCM highway, ATM or other buses.

The recent move towards de-regulation has enabled the subscriber to receive telephone services from providers other than the traditional telephone companies. One example is the competitive carriers in the United-States. In addition, non-telephone businesses, such as cable television and satellite-based network providers, are starting to offer telephone services. Thus, the customer may select added subscriber lines to be supplied by different service providers. FIG. 4 illustrates a configuration for such a customer, employing a telephone network 40. A first telephone line is supplied by a traditional telephone company as shown in FIG. 1 and previously described. However, a second telephone line is provided by a non-original telephone provider, which connects to non-telephone network 41. For example, this can be a cable television network. The voice channel is provided via a remote terminal unit 42, which provides the additional telephone line 6a, and communicates with the non-telephone network 41. For example, the remote terminal unit 42 can be part of Set-Top Box or Cable Modem.

Exchange Features

As used herein, the phrase "PABX-type features", or the idiomatic equivalent thereof, is intended to encompass features including, but not limited to: hold/call pick up; call transfer between subsets; conference calls; calls coming from, or going to, a central office exchange; ringing on all subsets; repertory dialing; memory dialing. A rapid expansion in residential-oriented telephone systems and equipment has been developing to satisfy an ever-growing number of needs related to telephone communication. One particular need in many residences is the ability to selectively communicate among a number of telephone sets all of which are connected via the single central office telephone line that accesses the residence. In addition, other identified needs of residential subscribers are similar to those of businesses having a private automatic branch exchange (PABX). However, most such existing exchanges require star topology, in which all outlets are directly connected to the exchange. While this topology is supported in some residences, most buildings do not employ such a topology, as the example in FIG. 1 illustrates. In such a case, a private automatic branch exchange cannot easily be employed, unless effort is made to modify the wiring into 'star' topology. U.S. Pat. Nos. 4,821,319, 4,459,434, 5,090,052, 5,596,631, 5,781,622 and 6,038,300, as well as other patents classified under U.S. Classes 379/177 and 379/363, disclose a few embodiments enabling limited exchange functionalities in a residence using single wire pair.

Data Over Telephone Lines

There is a requirement for simultaneously using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form a LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al (hereinafter referred to as "Reichert"). Also widely used are xDSL systems, primarily Asymmetric Digital Subscriber Loop (ADSL) systems.

As another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such a mechanism, the telephone service is not affected, while data communication capability is provided over existing telephone wiring within a home.

The Dichter network is illustrated in FIG. 5, which shows a network 50 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers (the term "transceiver" as used herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 5), telephones 13a, 13b, and 13c are directly connected to telephone line 5 via connectors 14a, 14b, and 14c, respectively. However, in order to avoid interference to the data network caused by the telephones, in a second embodiment (shown in FIG. 5) low pass filters (LPF's) 21a, 21b, and 21c are added to telephones 13a, 13b, and 13c from telephone line 5. Furthermore, a low pass filter may also be connected to Junction Box 16, in order to filter noises induced from or to the PSTN wiring 17. It is important to note that lines 5a, 5b, 5c, 5d, and 5e are electrically different segments of the same paired conductors.

Additional prior-art patents in this field can be found under U.S. Class 379/093.08, which relates to carrying data over telephone wiring without any modifications made to the telephone wiring (e.g. wires and outlets), U.S. Pat. No. 5,841,360 and U.S. patent application Ser. Nos. 09/123,486 and 09/357,379 to the present inventor are the first to suggest modifying the telephone wiring, by means of splitting the wiring into distinct segments, each of which connects two telephone outlets. In this way, the network is modified from 'bus' topology into multiple 'point-to-point' segments, enabling superior communication characteristics.

Part of such a network 60 is shown in FIG. 6, describing outlets 31a and 31b, substituting outlets 11 of FIG. 1. The telephone wiring 5 is split into distinct segments 5a, 5b, and 5c. Low-Pass Filters (LPF) and High-Pass Filters (HPF) are coupled to each wire segment end, in order to split between the telephony and the data signals. As shown in FIG. 6, LPF's 21b and 21c are respectively attached to opposite ends of the wiring segment 5b. The LPF's are designed to allow passing of the telephony signals, and are connected together thus offering a continuous path for the telephony signals. Access to the telephony signals is made via connectors 12a and 12b in the outlets, into which telephone devices 13a and 13b are connected via connectors 14a and 14b respectively. Thus, the telephony service is fully retained. The data signals, carried in the high part of the spectrum, are accessed via HPF's 22b and 22c, also coupled respectively to opposite ends of the telephone wire segment 5b. HPF's 22a and 22d are connected to the ends of the wire segments 5a and 5c respectively. Each HPF is connected to a modem 23, which transmits and receives data signals over the telephone wiring. Modems 23a, 23b, 23c, and 23d are connected to HPF's 22a, 22b, 22c and 22d respectively. Data units 24a and 24b are connected to the outlets 31a and 31b respectively, via a respective connector (not shown in the Figure) in each outlet. The data units are coupled via a respective DTE interface in the outlet. Outlets 31a and 31b comprise DTE interfaces 29a and 29b respectively. The three data streams in each outlet, two from each modem and one from the DTE, are handled by an adapter 28a and an adapter 28b, which serve outlets 31a and 31b, respectively. While FIG. 6 describes an embodiment wherein all the components for the relevant functions are housed within the outlet, other embodiments are also possible, wherein only some of the components for these functions are contained within the outlet.

Life-Line

The term "life-line" as used herein denotes the basic use of the telephone service for emergency purposes. As such, it is required that a malfunction of any other system or service (e.g. electricity) will not degrade the telephone system capability. In practical terms, this means that as long as an operational telephone set is connected to the exchange via continuous two wires, the telephone service will be maintained, even in the case of power outage.

There is thus a widely recognized need for, and it would be highly advantageous to have, a means for implementing a telephone system in-home, wherein the telephone units can be networked within the home as well as to multiple external subscriber lines, without requiring the installation of additional wires within the home. This goal is met by the present invention.

SUMMARY OF THE INVENTION

The present invention, discloses an improved telephone system within a building over a single telephone line. The telephone line with the building is used as a medium for a communication network carrying multiple voice channels in a TDM (Time Domain multiplexing) fashion. New wiring or a pre-existing telephone lines may be used. In each outlet, conversion between one or more of the data voice channels to and from a standard analog telephone signal (POTS) is performed by a module. The exchange features previously described are implemented by digitally routing the voice channels between the outlets. Signals from external telephone feeders (connections between the telephone service provider's central office and the line within the building) can also be digitized by a module and routed within the communication network. In this way, standard analog telephone equipment and signals therefrom can be interfaced by the modules and used in a multiple voice channel network over a single telephone line.

Two types of communication network are supported. In the first configuration, the telephone wiring is retained in the typical continuous arrangement, thereby forming a bus-type network where the module within each outlet has a single telephone-line modem. In the second configuration, the telephone lines are broken at each outlet, and a telephone-line modem is coupled to each wire end, thereby forming point-to-point communication segments between each pair of connected outlets.

The module that couples the telephone line to the telephone interface, or any of the components of the module, can be fully integrated into the outlet, partially integrated into the outlet, or externally configured.

Life-line functionality is facilitated by using passive filters to separate the available line bandwidth into a low band and a high band. The high band is used by the multiple voice channel communication network, while the low band is used for carrying a standard analog telephone service without using any active components. In such a case, each outlet may contain a life-line telephone interface and one or more telephone interfaces for the voice channels carried by the communication network.

Therefore, the present invention provides for use with a telephone installation within a building, the telephone installation having a line and external connections between the line and a central office of a telephone service provider, a system for connecting to the telephone installation so as to allow more voice channels to be carried over the line without requiring modification or extension of the telephone installation, the system comprising at least two modules for coupling to the telephone line, wherein said modules are operative for:

(i) converting between at least one standard analog telephone signal and at least one time-domain multiplexed voice channel; and (ii) interfacing with standard analog telephone equipment and signals therefrom.

Furthermore, according to the present invention there is provided a kit for upgrading a pre-existing telephone installation having a line within a building so as to allow more voice channels to be carried over the line without requiring modification or extension of the telephone installation, the kit including:

(i) at least one outlet, said outlet having a connection for coupling to the line; and (ii) a module operative for:

a) converting between at least one standard analog telephone signal and at least one time-domain multiplexed voice channel; and b) interfacing with standard analog telephone equipment and signals therefrom.

Moreover, according to the present invention there is provided a method for upgrading a pre-existing telephone installation having a line within a building, so as to allow more voice channels to be carried over the line without requiring modification or extension of the telephone installation, the method including the steps of:

(i) providing a telephone line modem;

(ii) providing a subscriber-line interface;

(iii) providing a drop-and-insert multiplexer for interfacing between the voice channels and said subscriber-line interface;

(iv) providing an outlet; and (v) equipping said outlet with said telephone-line modem, said subscriber-line interface, and said drop-and-insert multiplexer.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
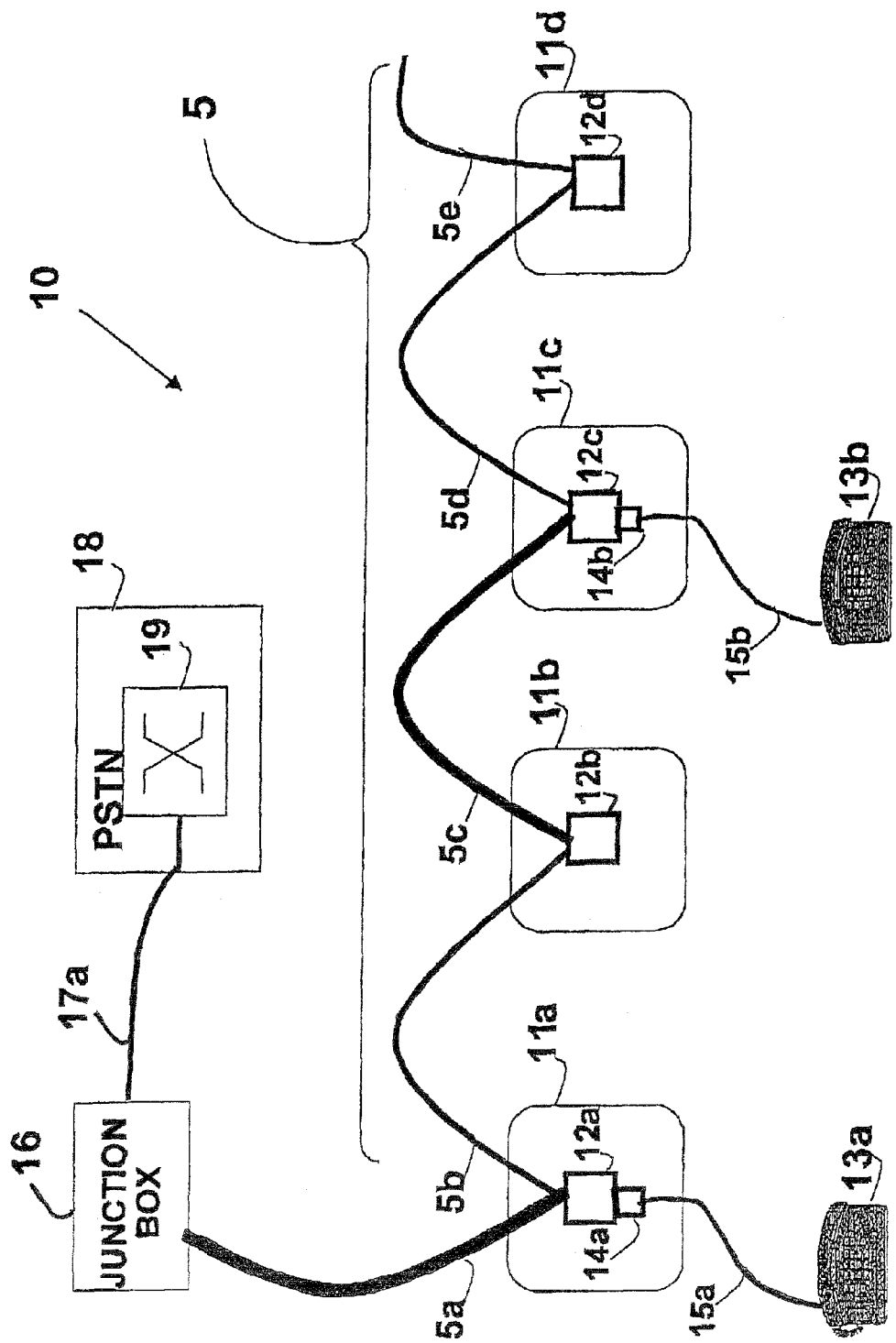
FIG. 1 shows a common prior art telephone line wiring configuration for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 5:
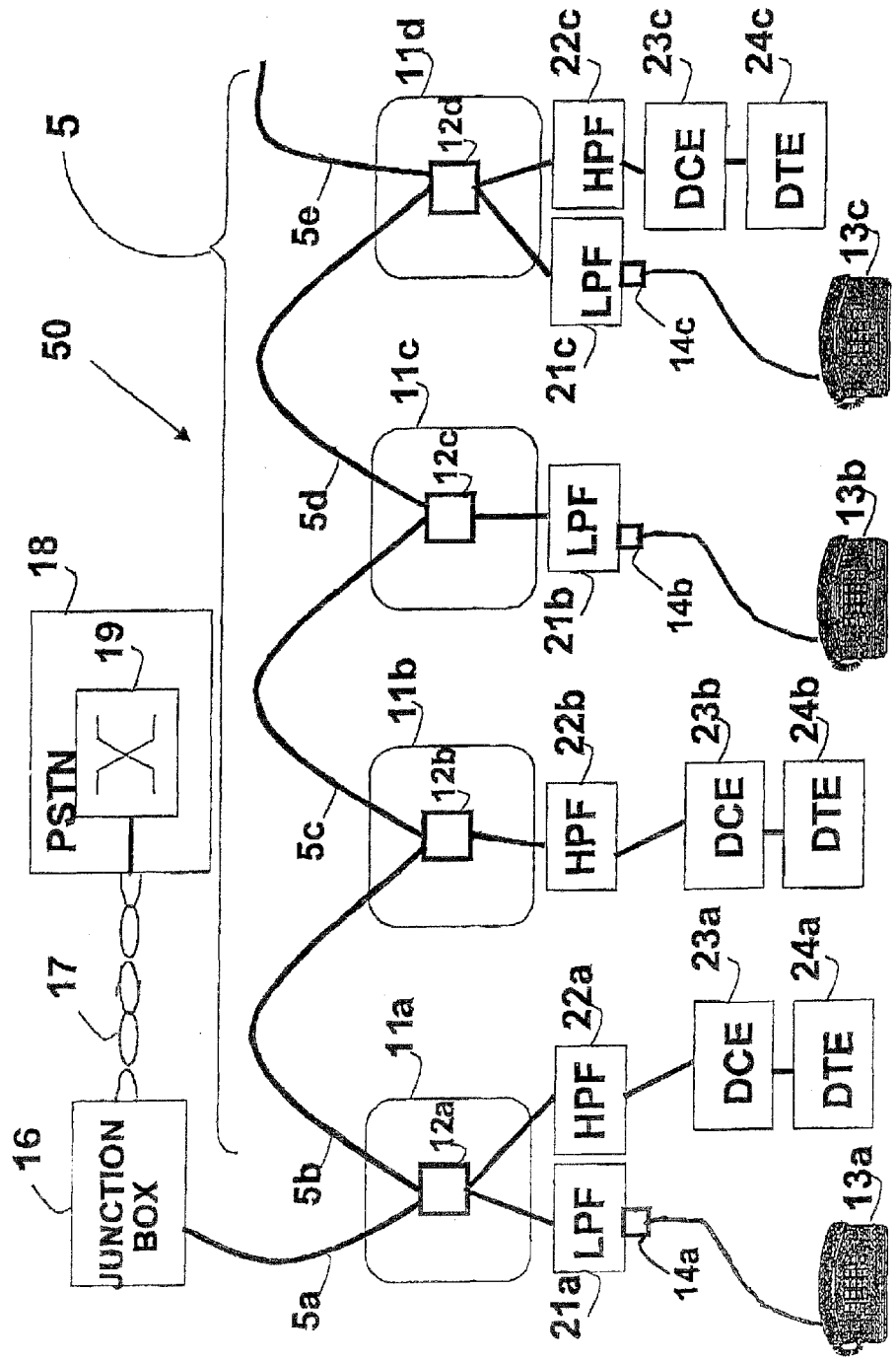
FIG. 5 shows a first prior-art local area network based on telephone line wiring for a residence or other building.
Figure 7:
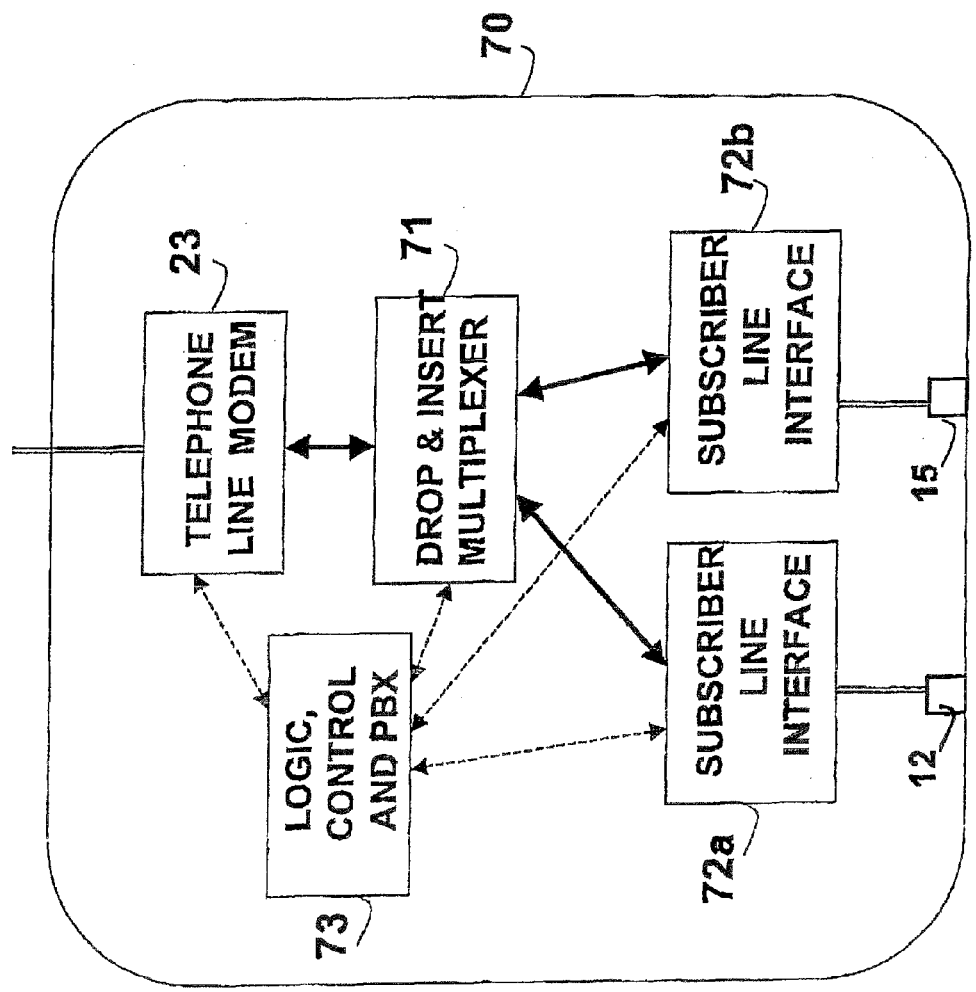
FIG. 7 shows a module according to a first embodiment of the present invention.

A first embodiment of the present invention is based on an adapter module (hereinafter denoted as a "module"), which enables the connection of a standard telephone set to the data communication network over the telephone line. FIG. 7 illustrates the functionality of a module 70. Module 70 has two ports: one for connecting to the telephone line and the other for connecting to one or more telephone sets. The module interfaces the data communication network over the telephone line by a telephone line modem 23, which can use DCE 23a as in Dichter network 50 (FIG. 5). The data communication network carries multiple digitized (e.g. PCM) voice channels. A drop-and-insert multiplexer 71 installs and exacts voice channels to and from the digital data stream in the data communication network. The voice channels to be handled by module 70 are managed by a logic, control and PBX unit 73. Each voice channel is converted into single telephone (POTS) interface via a subscriber line interface 72a, which converts the digital voice channel stream into an analog interface, capable of connecting to a standard telephone set via a connector 12. In order to facilitate a second telephone to be connected to the module 70, an additional subscriber line interface 72b is added, and couples to multiplexer 71 and to the logic, control and PBX unit 73. Subscriber line interface 72b handles an additional distinct voice channel. An additional telephone set can connect to subscriber line interface 72b via a connector 15. While the module 70 is described as having two-line support via connectors 12 and 15, to subscriber line interfaces 72a and 72b respectively, the same arrangement also applies to a single-line interface, from which subscriber line interface 72b and connector 15 are omitted. It is also clear that module 70 can support more than two such interfaces, where each such additional such interface requires an additional subscriber line and connector, as well as a respective support by drop-and-insert multiplexer 71.

Module 70 may also contain additional logic, control, processing, data storage, and a power-supply. Except for facilities such as logic, control, and PBX capabilities, which are handled by unit 73, such additional functions are performed by other components not shown in FIG. 7.

Figure 8:
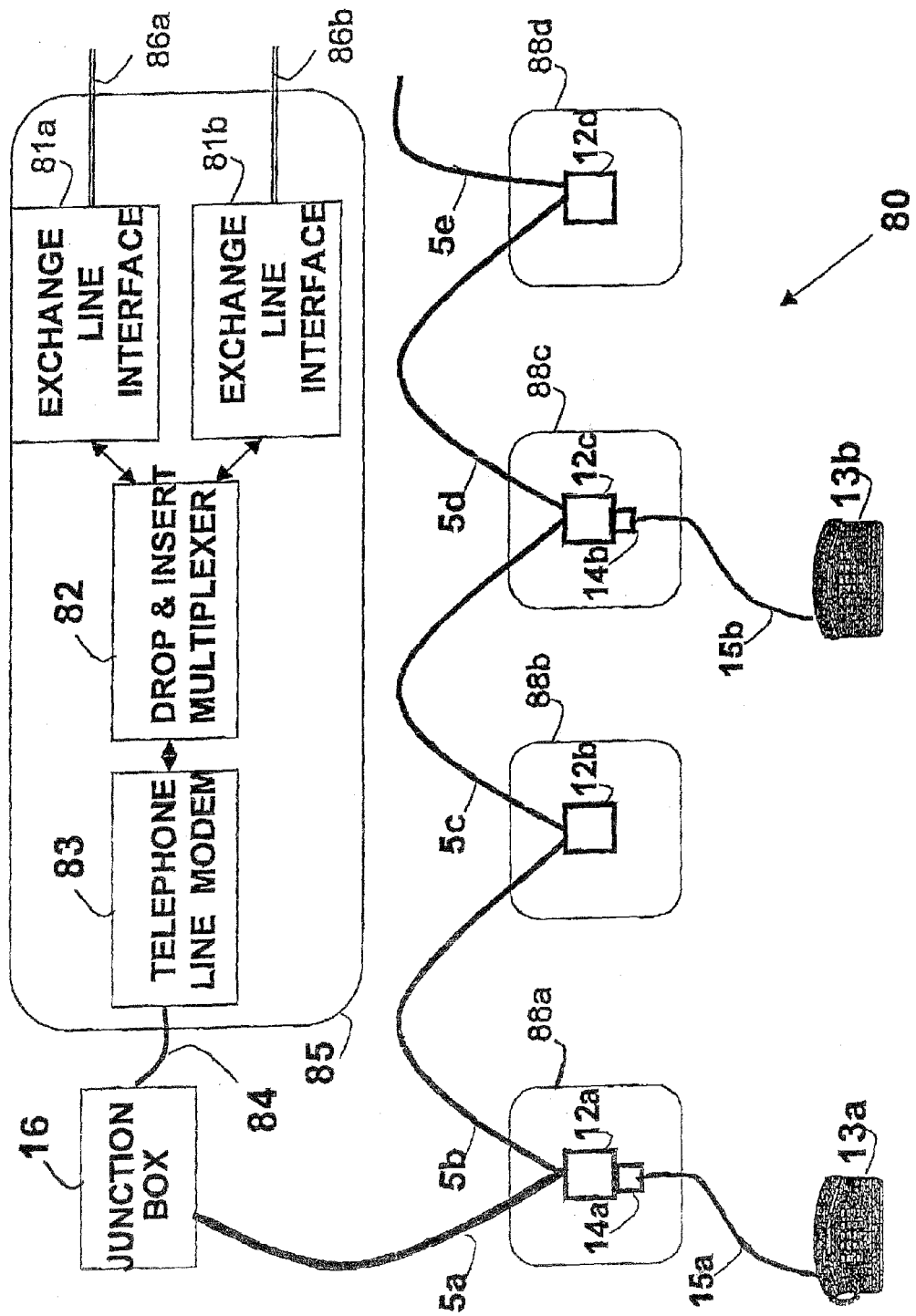
FIG. 8 shows a telephone network according to the first embodiment of present invention.

A first embodiment of a network of the present invention is based on the Dichter network. FIG. 8 illustrates a network 80, and is based upon modules, such as module 70 (FIG. 7), where each module allows a single telephone set to interface via connector 12. Each such module 70 is fully housed and integrated within a telephone outlet, such as outlets 88a, 88b, 88c, and 88d, where telephone line modem 23 connects to the telephone line port of the outlet, and the telephone connector connects to the telephone set.

Figure 2:
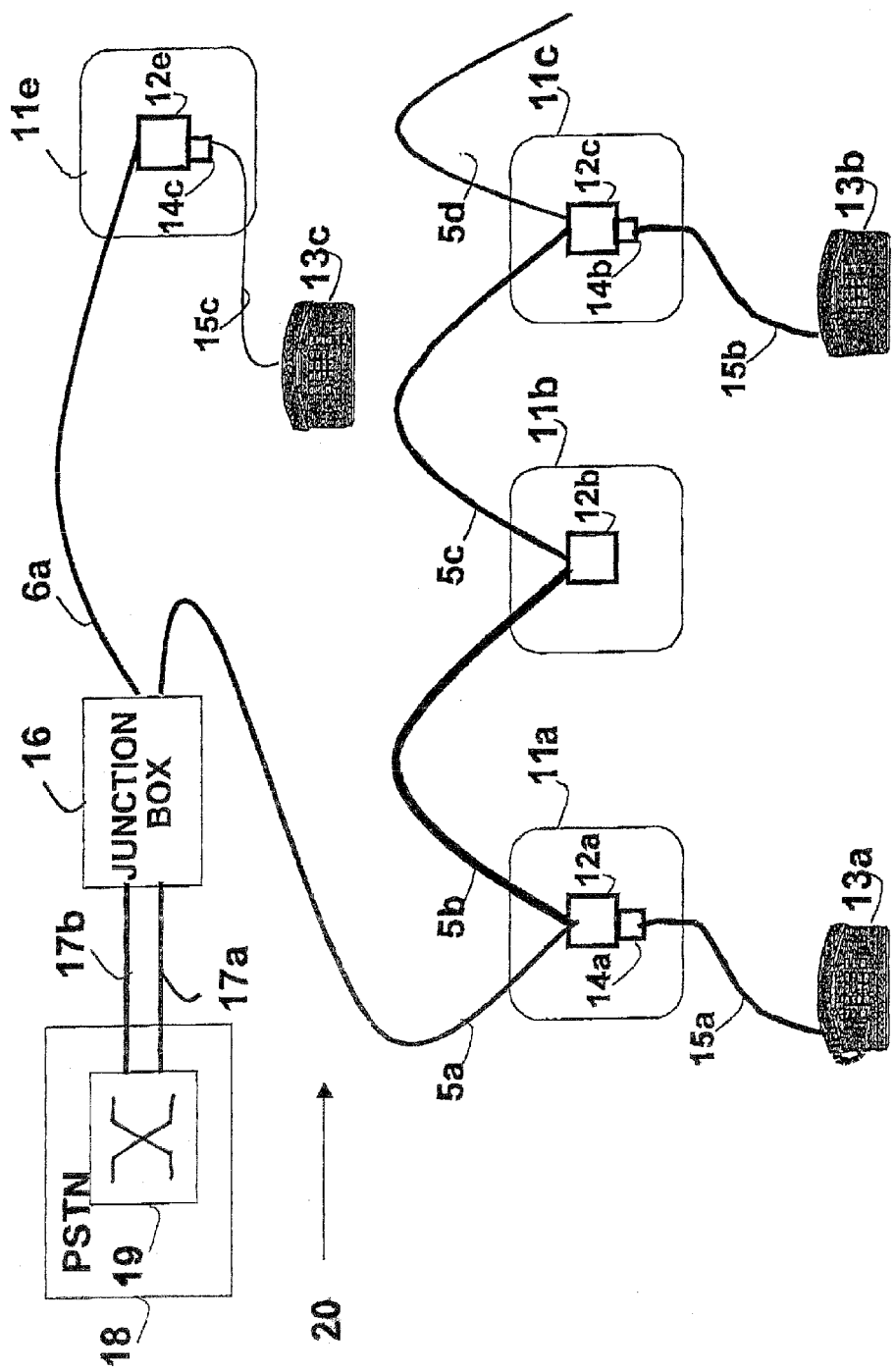
FIG. 2 shows a prior art two-line telephone wiring configuration for a residence or other building.
Figure 3:
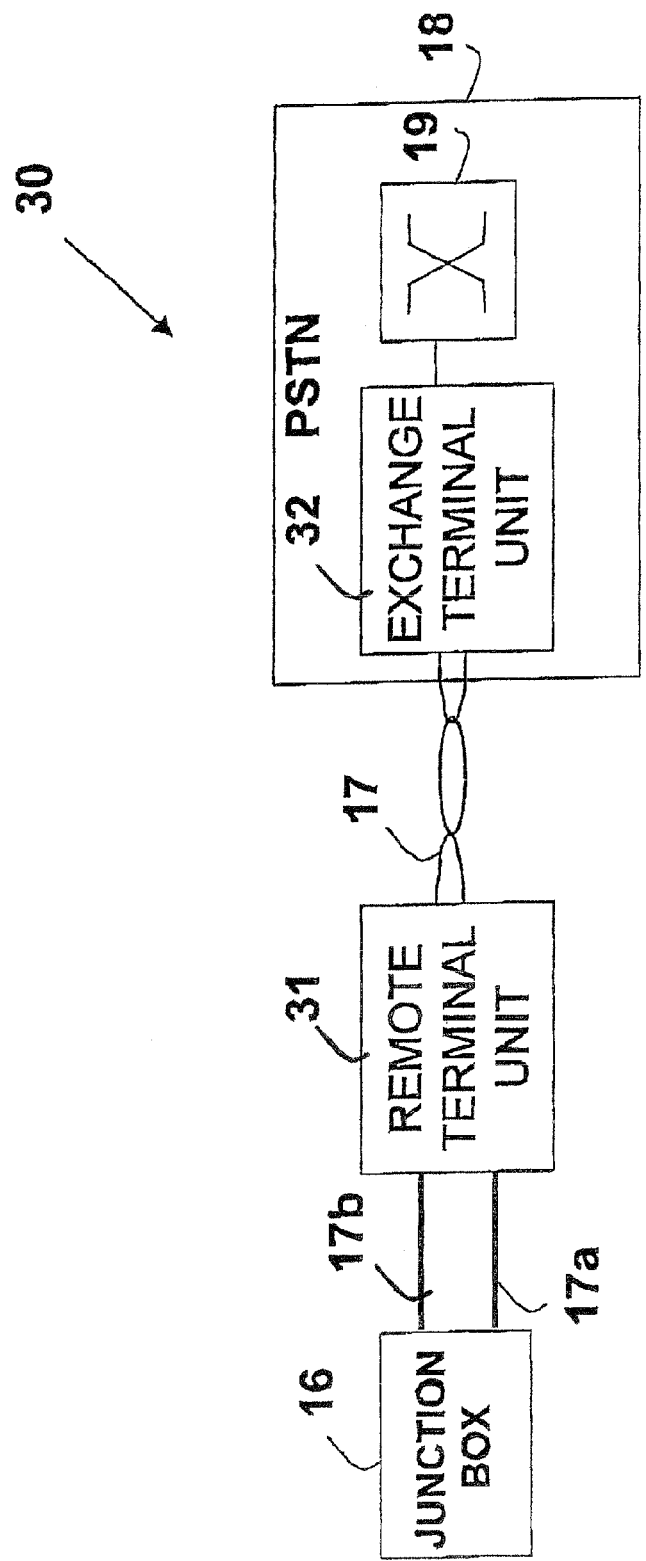
FIG. 3 shows a first prior-art telephone network for providing multiple lines to a residence or other building.
Figure 4:
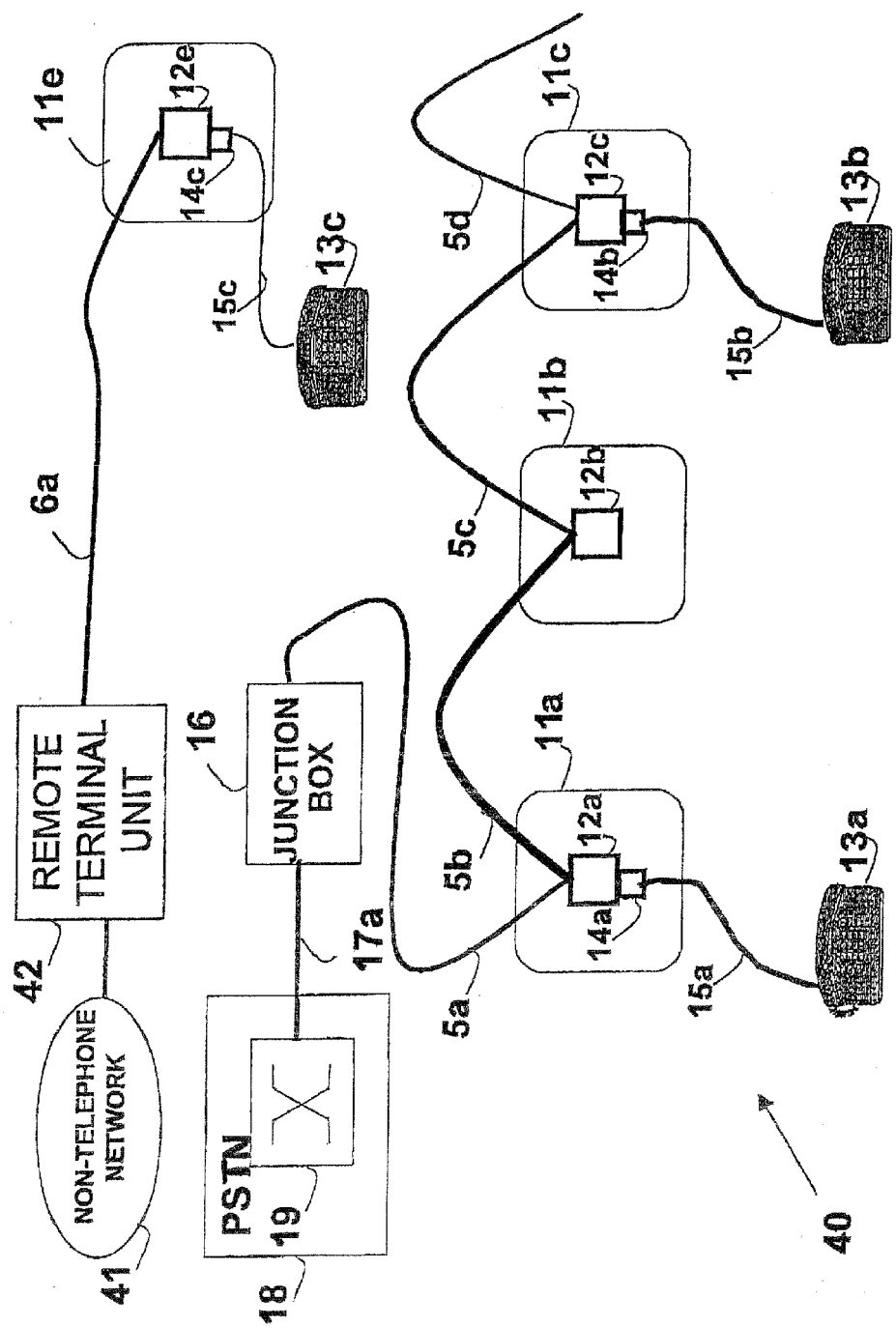
FIG. 4 shows a second prior-art telephone network for providing multiple lines to a residence or other building.

As shown in FIG. 8, a data communication network is formed such that the telephone line modem (as telephone line modem 23) within each outlet (such as outlets 88a, 88b, 88c, and 88d) allows networking between and among the outlets, using telephone line 5a, 5b, 5c, 5d, and 5e as the network media. Thus, telephones 13a and 13b can communicate between network. In order to facilitate connection to external telephone networks, a module 85 must be added. Module 85 bridges the external telephone lines to the in-home data communication network over the telephone line. Network 80 interfaces to two external telephone lines via wire pairs 86a and 86b, which can be part of a PSTN network as shown in FIG. 2, or from other outside sources as previously described. External lines 86a and 86b are converted to digital streams by exchange line interfaces 81a and 81b respectively. The voice channels are coupled to a drop-and-insert multiplexer 82, which inserts into or extracts from the digital multiplexed data stream. The multiplexed data stream is coupled to a telephone line modem 83, which communicates via a cable 84 with the in-home data network.

While network 80 has been described having two external feeders 86a and 86b, it is clear that a single such feeder can also be used. For example, if only line 86a is used, exchange line interface 81b is unnecessary. Alternatively, more than two such external feeders can be used. For each additional feeder, an additional exchange line interface must be furnished, along with additional support capability of the drop-and-insert multiplexer 82.

Implementing the network 80 within a residence requires replacing telephone outlets, such as outlet 11a (FIG. 1) by outlets according to the present invention, such as outlet 88a (FIG. 8), each containing a module, such as module 70 (FIG. 7). In this case, the line segments 5a, 5b, 5c, 5d and 5e each correspond to the single twisted pair shown in FIG. 7 connected to the telephone line modem, and the outlets 88a, 88b, 88c and 88d are connected to the line segments using a bus topology. In addition, a module such as nodule 85 must also be installed near the junction box 16. However, no new lines within the building need be installed or routed. After installing the network 80 within a residence, both the exchange features and the capability to interface two or more external telephone lines are available.

Figure 9:
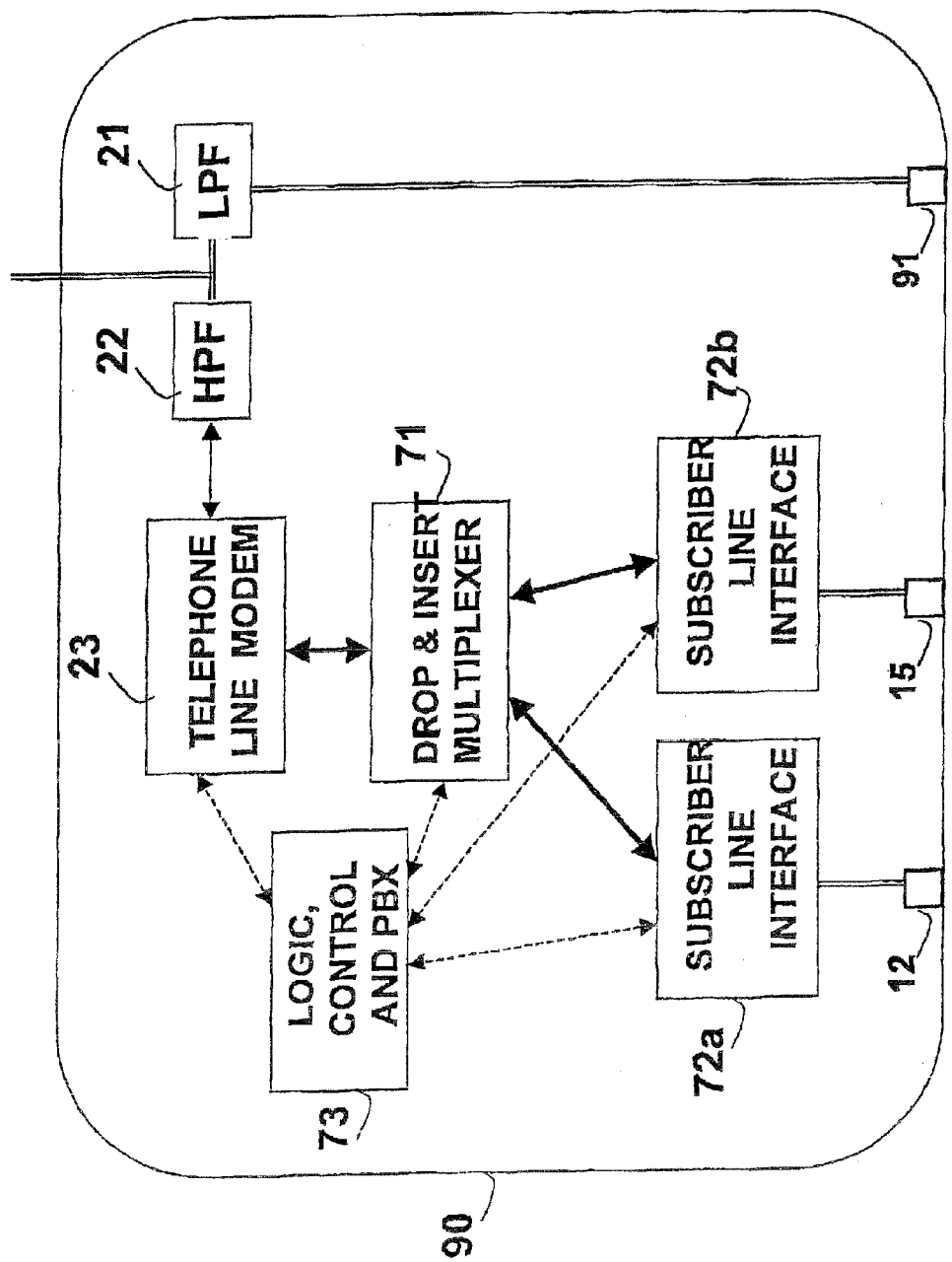
FIG. 9 shows a module according to the first embodiment of the present invention, which supports life-line capability.

Both module 70 and module 85 contain active components. Thus, in the event of a power loss or malfunction in any of the components, the network 80 may fail to provide telephony service. In order to support 'life-line' capability, therefore, the module requires additional components. FIG. 9 illustrates a modified module 90 that provides life-line capability. A High-Pass Filter (HPF) 22 and a Low-Pass Filter (LPF) 21 split the telephone spectrum into a low band for carrying standard analog signals, and into a high band for the data communication network, as described by Dichter. LPF 21 uses only passive components, and is directly coupled to a connector 91. Hence, a telephone set plugged into the connector 91 can provide 'life-line' functionality, without any active components involved in the signal path. Module 90 may feature only the life-line connector 91, or may have the life-line connector 91 in addition to the connectors 12 and 15. Alternatively, in other embodiments of the present invention, modules may not employ 'life-line' connection 91 at all.

Figure 10:
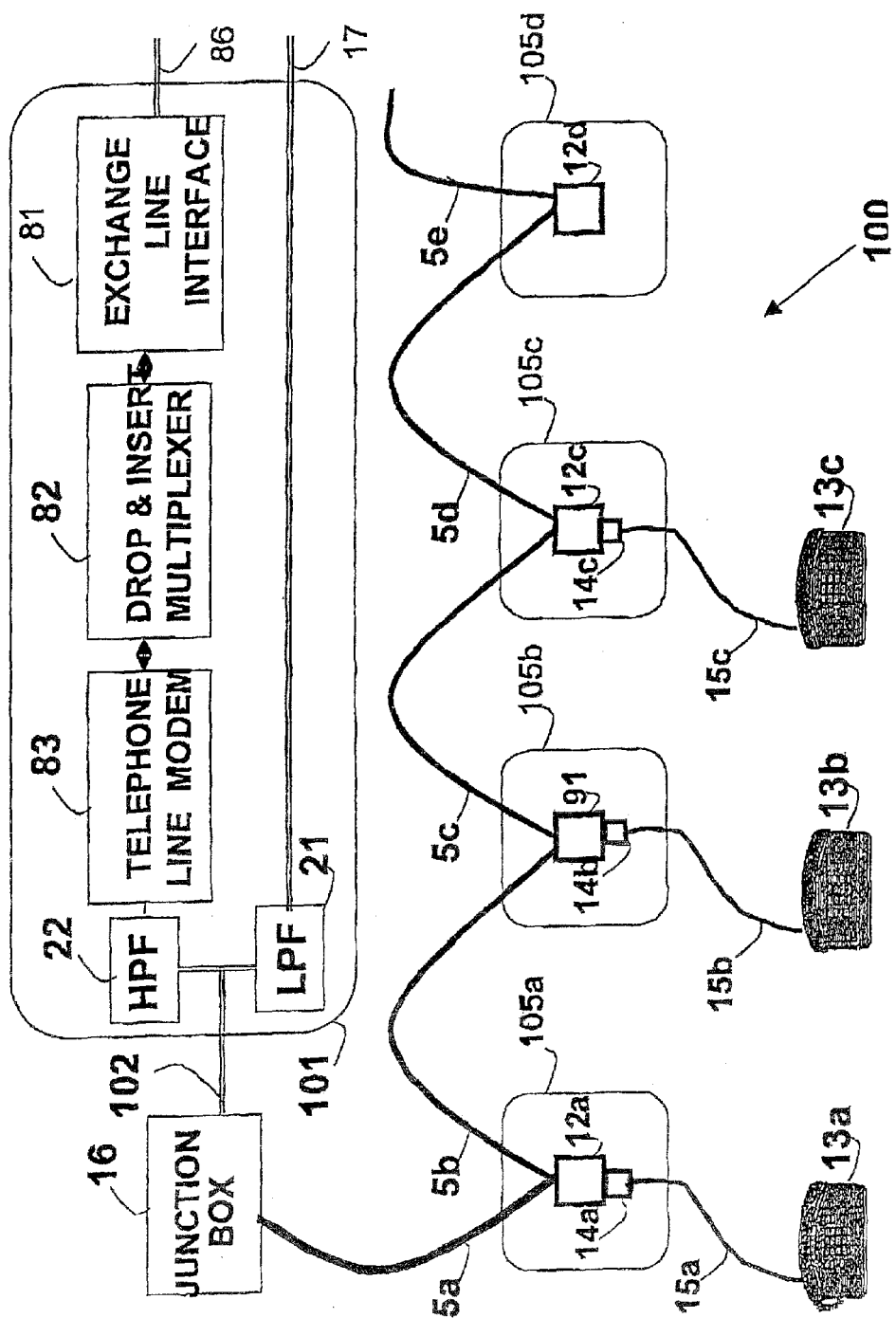
FIG. 10 shows a telephone network according to the first embodiment of present invention, which also support life-line capability.

FIG. 10 illustrates a network 100 according to the first embodiment of the invention, and features a modified network supporting life-line functionality. Network 100 includes modules 90a, 90b, 90c, and 90d, integrated within outlets 105a, 105b, 105c, and 105d respectively. Here, too, the line segments 5a, 5b, 5c, 5d and 5e each correspond to the single twisted pair shown in FIG. 9 connected to the junction of the low pass filter 21 and the high pass filter 22, and the outlets 105a, 105b, 105c and 105d are connected to the line segments using a bus topology. Outlets 105a, 105c, and 105d have connectors 12a, 12c and 12d respectively, which support telephony interfaces based on voice signals carried by the data communication network. However, outlet 105b also has a connector 91, which provides the life-line connection as shown in FIG. 9. The low band of the spectrum carries POTS signals from telephone line 17, connected to the in-home network via HPF 21. Hence, telephone set 13b is directly connected to line 17, thereby offering life-line service. The high band of the spectrum is used for the data communication network, and connects externally via HPF 22. Both LPF 21 and HPF 22 are connected by a cable 102 to junction box 16. All components serving the external line interface are included in module 101. In another embodiment of the present invention, each outlet (such as outlets 105a, 105b, 105c, and 105d) provides both life-line interface 91 in addition to at least one telephone interface 12, such that life-line access is available in all outlets within the residence.

While FIG. 10 illustrates the case where the module 90 is fully integrated within the outlet 105, embodiments of the present invention also include those where the module is external to the outlet. Likewise, selected components of a module may be integrated within the outlet while other components remain external. In all cases, of course, the appropriate electrical and mechanical connection between the module and the outlet are required.

An outlet according to the invention is physically similar in size, shape, and overall appearance to a standard outlet, so that such an outlet can be substituted for a standard outlet in the building wall. No changes are required in the overall telephone line layout or configuration.

Figure 6:
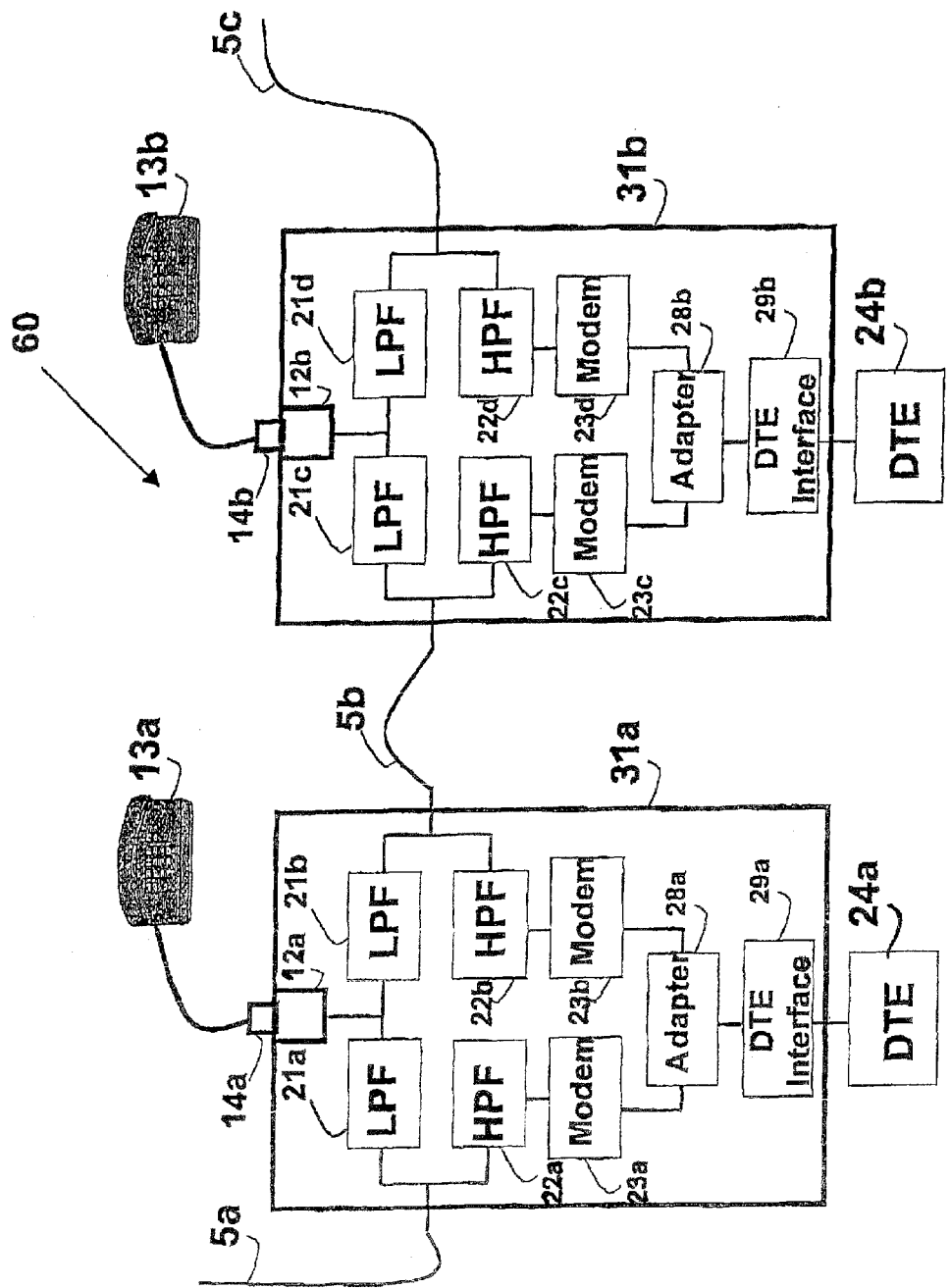
FIG. 6 shows part of a second prior-art local area network based on telephone line wiring for a residence or other building.
Figure 11:
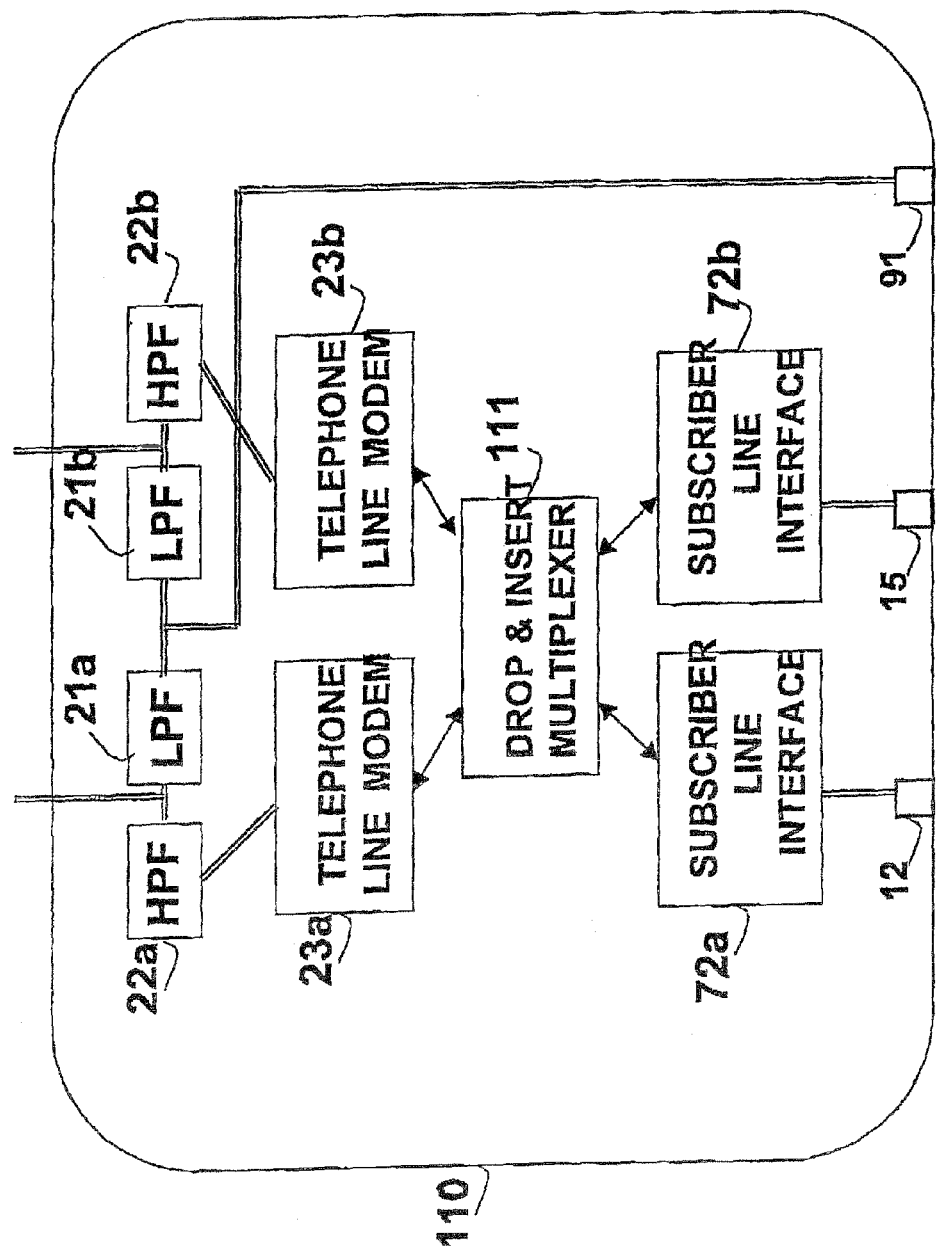
FIG. 11 shows a module according to a second embodiment of the present invention, which supports life-line capability.

While the invention has been so far described wherein the data communication network is based on the Dichter topology, the present invention can equally-well be applied to the prior-art wired network topology illustrated in FIG. 6, which is based on point-to-point data communication between any pair of connected outlets. FIG. 11 illustrates a module 110 supporting such a network, along with the life-line feature. The general configuration is similar to the module 90 described in FIG. 9. However, the connection to each telephone line segment of the point-to-point configuration has a high-pass filter (such as an HPF 22a and an HPF 22b) a low-pass filter (such as an LPF 21a and an LPF 21b), and a dedicated telephone line modem (such as modem 23a and modem 23b). A drop-and-insert multiplexer 111 inserts the voice channels into, and extracts the voice channels from, both data streams handled by telephone line modems 23a and 23b. However, voice channels not used by the module should be routed to other modules. In the case where three line segments are connected, an additional such set is required. The two LPF's 21a and 21b provide direct access to the lower band of the spectrum, and are jointly connected to life-line connector 91. If life-line support is not required, filters 21a, 21b, 22a, and 22b, as well as connector 91 can be omitted. Logic, control, PBX and other components such as power supply are not shown in FIG. 11. Additional capabilities may be provided by such components to manage such tasks as data handling and protocol conversions.

Figure 12:
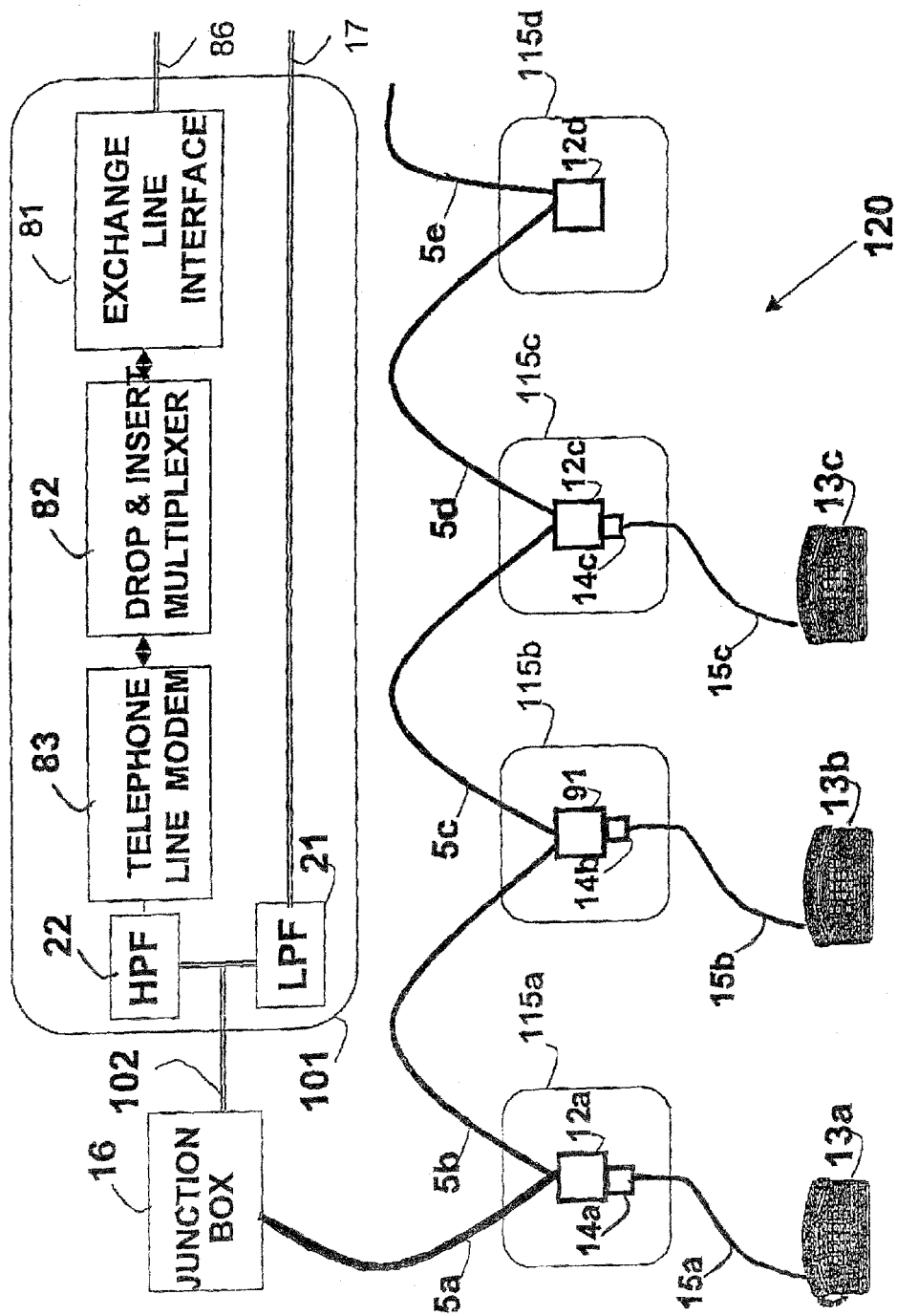
FIG. 12 shows a telephone network according to the second embodiment of present inventions which also support life-line capability.

FIG. 12 illustrates a network 120 utilizing the modules 110. Each outlet such as outlet 115a, 115b, 115c, and 115d, contains a module such as module 110 (FIG. 11). In this case, however, the line segment 5a corresponds to the twisted pair shown in FIG. 11 connected to the junction of the low pass filter 21a and the high pass filter 22a, whilst the line segment 5b corresponds to the twisted pair shown in FIG. 11 connected to the junction of the low pass filter 21b and the high pass filter 22b. In like manner, the line segments (5b, 5c), (5c, 5d), and (5d, 5e) each connected to the outlets 115b, 115c and 115d correspond to a respective twisted pair connected respectively to the junction of the low pass filter 21a and the high pass filter 22a and to the junction of the low pass filter 21b and the high pass filter 22b in FIG. 11. In general, the network structure of network 100 (FIG. 10) is retained. However, in this configuration, the outlets 115a, 115b, 115c and 115d are connected to the line segments using a point-to-point (or daisy chain) topology.

Upgrade Kit

Figure 13:
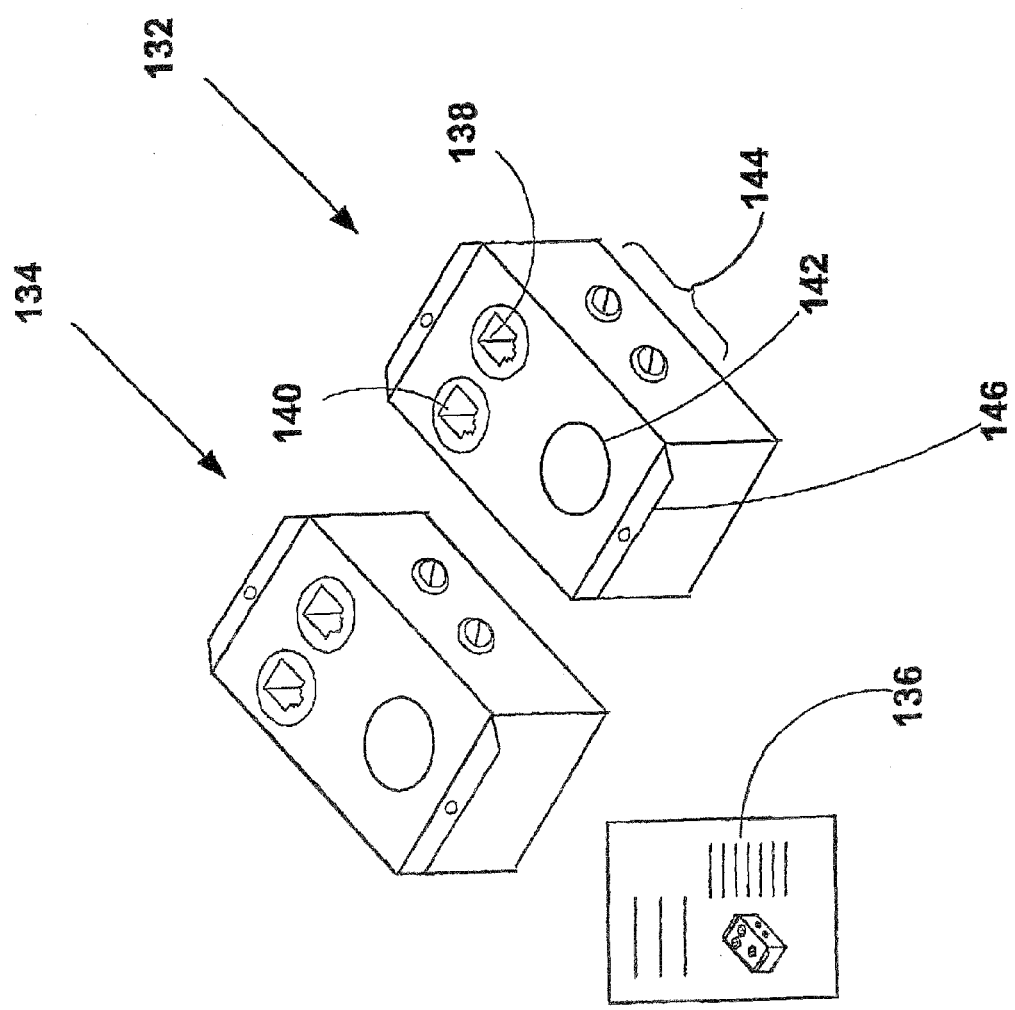
FIG. 13 shows a kit for upgrading an existing telephone installation to support a system according to the present invention.

The present invention also provides for a kit for upgrading an existing telephone installation to support a network as described herein. FIG. 13 illustrates an embodiment of such a kit containing an outlet 132 and an outlet 134 and installation instructions 136. Outlet 132 has a connection 144 for coupling to a telephone line and mounting points such as a flange 146 for installing in the building walls. Outlet 132 also has a jack 138 and a jack 140. The first supports life-line telephone service via connector 91 (FIG. 9) while the latter provides telephone service with improved exchange features. Within outlet 132 is a module according to the present invention, as previously described and illustrated in FIG. 9 or FIG. 11. Likewise, in an embodiment of the present invention, jack 138 is a telephone jack. In another embodiment, jack 140 is a data jack. The embodiment of the kit illustrated in FIG. 13 has two outlets, outlet 132 and outlet 134, which are illustrated as substantially identical. However, in another embodiment, the kit contains only outlet 132. Other variations are also possible in different embodiments. As with the modules described previously, additional components and capabilities may be provided to manage such tasks as data handling and protocol conversions.

The present invention also provides a method for upgrading a pre-existing telephone installation having a line within a building, to support a network as described herein. The method involves:

(i) providing a telephone line modem;

(ii) providing a subscriber-line interface;

(iii) providing a drop-and-insert multiplexer for interfacing between the voice channels and said subscriber-line interface;

(iv) providing an outlet; and (v) equipping said outlet with said telephone-line modem, said subscriber-line interface, and said drop-and-insert multiplexer.

In another embodiment of the present invention, the existing installation can be upgraded to support life-line communication. In such a case, there are the additional steps of:

(vi) providing passive high-pass and low-pass filters for separating a lower band for standard analog telephone service from a higher band for multiplexed voice channels;

(vii) connecting the filters to isolate the standard analog telephone service from the multiplexed voice channels; and (viii) providing a connector to connect a standard telephone set to the standard analog telephone service.

While the invention has been described with respect to a limited number of embodiments, it will be appreciated that many variations, modifications and other applications of the invention may be made, Thus, for example, whilst the invention has been described with particular reference to a network installed in a domestic residence, it will be apparent that no such limitation is intended and the invention is equally well applicable for use in non-domestic premises such as office, factories and the like.

What is claimed is:

1. A telephone system providing a terminal for a telephone service, for use with a local area network in a building comprising local area network wiring connected for carrying at least one digitized voice channel, the system comprising:
    a connector for connecting to the local area network wiring;
    a local area network transceiver coupled to the connector and operative to effect point-to-point communication with a single mating transceiver over the local area network wiring in the building;
    a telephone set for initiating and terminating telephone calls with the telephone service; and
    a converter coupled between said telephone set and said local area network transceiver for converting between said at least one digitized voice channel and analog voice signals.

2. The system according to claim 1, wherein the local area network wiring is existing wiring in walls of the building and said system is operative to communicate with another system that is interchangeable with said system in the building over the wiring.

3. The system according to claim 1, wherein the wiring is connected to concurrently carry another distinct signal.

4. The system according to claim 3, wherein the wiring is a telephone wiring.

5. The system according to claim 1, wherein the wiring further carry data signals, and said system further comprises a data connector operative to couple the data signals to a data unit.

6. A device for coupling a telephone device to one or more time-domain multiplexed digitized voice channels carried over a Local Area Network (LAN) in a building, said device comprising:
    a local area network (LAN) modem couplable to the LAN and operative to communicate said voice channels with another modem that is interchangeable with said LAN modem in the building over the LAN;
    a subscriber line interface coupled to said LAN modem and operative to convert a first voice channel to a first analog telephone signal;
    a first telephone connector coupled to said subscriber line interface and couplable to a telephone device to couple the first analog telephone signal to the telephone device; and
    a single enclosure housing said LAN modem, said subscriber line interface and said first telephone connector.

7. The device according to claim 6, wherein said LAN is connected to carry at least first and second time-domain multiplexed digitized voice channels, and wherein said device is operative to pass only the first voice channel between said LAN modem and said subscriber line interface.

8. The device according to claim 6, wherein: the LAN is connected to use bus-topology wiring as a communication medium, the wiring comprising at least two conductors; said modem is adapted to transmit and receive the voice channels over the wiring; and said device further comprises a first connector coupled to said LAN modem for connecting to the wiring.

9. The device according to claim 8, wherein the wiring is at least in part installed in walls of the building, and is accessed via an outlet, and said first telephone connector is pluggable to the outlet.

10. The device according to claim 9, wherein the wiring is a telephone wire pair connected to also carry an analog telephone signal using frequency domain multiplexing, and wherein said first telephone connector is a telephone plug.

11. The device according to claim 6, wherein said device is dimensioned to be mountable in an outlet cavity in a wall.

12. The device according to claim 6, wherein the multiplexed digitized voice channels are carried using a Pulse Code Modulation (PCM) scheme.

13. The device according to claim 6, further comprising means for detachably electrically and mechanically coupling said device to an outlet opening in a wall.

14. The device according to claim 6, wherein said single enclosure is constructed to have at least one of the following:
    a form substantially similar to that of a standard outlet;
    wall mounting elements substantially similar to those of a standard wall outlet;
    a shape allowing direct mounting in an outlet opening or cavity; and
    a form to at least in part substitute for a standard outlet.

15. A telephone system providing a terminal for a telephone service, for use with a Local Area Network (LAN) in a building carrying at least one time domain multiplexed digitized voice channel, said system comprising:
    a port for coupling to the LAN;
    a local area network modem coupled to said port and operative to communicate over the LAN with one or more mating modems; and
    a converter coupled to said LAN modem for converting between the digitized voice channel and analog voice signals, wherein said system is operative for initiating and terminating telephone calls with a telephone service outside the building.

16. The system according to claim 15, wherein the LAN is connected to carry at least first and second time-domain multiplexed digitized voice channels, and said system is operative to pass only the digitized voice channel between said LAN modem and said converter.

17. The system according to claim 15, wherein: the LAN is connected to use bus-topology wiring as a communication medium, the wiring comprising at least two conductors; said modem is adapted to transmit and receive the digitized voice channel over the wiring; and said port comprises a first connector coupled to said LAN modem for connecting to the wiring.

18. The system according to claim 17, wherein the wiring is at least in part installed in walls of the building, and is accessed via an outlet, and said first connector is pluggable to the outlet.

19. The system according to claim 18 wherein the wiring is a telephone wire pair also connected to carry an analog telephone signal using frequency domain multiplexing, and wherein said first connector is a telephone plug.

20. The system according to claim 15, wherein: the LAN is connected to use a point-to-point wiring as a communication medium; the wiring comprises at least two conductors; said modem is adapted to transmit and receive the digitized voice channel with a further interchangeable modem over the wiring; and said port comprises a first connector coupled to said LAN modem for connecting to the wiring.

21. The system according to claim 20, wherein the wiring is at least in part installed in walls of the building, and is accessed via an outlet, and said first connector is pluggable to the outlet.

22. The system according to claim 21, wherein the wiring is a telephone wire pair also connected to carry an analog telephone signal using frequency domain multiplexing, and wherein said first connector is a telephone plug.

23. The system according to claim 15, wherein the multiplexed digitized voice channel is carried using a Pulse Code Modulation (PCM) scheme.

24. The system according to claim 15, wherein said system is enclosed in a single enclosure which is constructed to have at least one of the following:
 a form substantially similar to that of a standard outlet;
 wall mounting elements substantially similar to those of a standard wall outlet;
 a shape allowing direct mounting in an outlet opening or cavity; and
 a form to at least in part substitute for a standard outlet.

25. A device for coupling one or more analog telephone sets to multiple digitized voice channels, for use with a telephone wire pair in a building connecting to a telephone service, the telephone wire pair being connected to simultaneously carry an analog telephone signal (POTS) in an analog telephone frequency band and a digital data signal in a digital data frequency band distinct from, and higher than, the analog telephone frequency band, the digital data signal comprising at least first and second time-domain multiplexed digitized voice channels, said device comprising:
 a first telephone connector for connecting to the telephone wire pair;
 a telephone line modem for transmitting and receiving over the telephone wire pair;
 a high pass filter coupled between said first telephone connector and said telephone line modem for substantially passing only signals in the digital data frequency band;
 a first subscriber line interface coupled to said telephone line modem and operative to convert the first digitized voice channel to a first analog telephone signal; and
 a second telephone connector coupled to said first subscriber line interface and couplable to a first analog telephone set to couple a first analog telephone signal to the first analog telephone set,
wherein, in a first state of said device, the first digitized voice channel is passed between said telephone line modem and said first subscriber line interface for coupling the first digitized voice channel to the first analog telephone set, and, in a second state of said device, the second digitized voice channel is passed between said telephone line modem and said first subscriber line interface for coupling the second digitized voice channel to first analog telephone set.

26. The device according to claim 25, wherein the digital data signal contains telephony data and is based on a PCM or ATM protocol.

27. The device according to claim 25, wherein the digital data signal is Digital Subscriber Line (DSL) based, and the telephone line modem is a DSL modem.

28. The device according to claim 27, wherein the digital data signal is Asymmetric Digital Subscriber Line (ADSL) based, and the telephone line modem is an ADSL modem.

29. The device according to claim 25, further operative to couple the second digitized voice channel to a second analog telephone set, said device further comprising:
 a second subscriber line interface coupled to said telephone line modem and operative to convert a voice channel to a second analog telephone signal; and
 a third telephone connector coupled to said second subscriber line interface and couplable to a second analog telephone set to couple the second analog telephone signal to the second analog telephone set,
wherein said device is further operative to simultaneously couple each of the first and second analog telephone sets to a respective one of the first and second digitized voice channels.

30. The device according to claim 29, further operative to support exchange/PBX-type features between the first and second analog telephone sets.

31. The device according to claim 30, wherein said exchange/PBX-type features are at least one of: hold/call pick-up; call transfer; conference call; intercom; ringing all; repertory dialing; and memory dialing.

32. The device according to claim 30, wherein said exchange/PBX-type features include an intercom function, and wherein a telephone session can be executed between the first and second telephone sets.

33. A system for coupling one or more telephone apparatuses in a building to a telephone service provided by a telephone service provider, the system comprising:
 a Wide Area Network (WAN) at least in part outside of a building for coupling to a telephone network carrying one or more time-domain multiplexed digitized voice channels and operated by the telephone service provider;
 a Local Area Network (LAN) in the building for digital data communication between devices located in the building;
 a gateway for coupling between said LAN and WAN, said gateway comprising:
  a WAN port for coupling to said WAN;
  a WAN modem coupled to said WAN port for bi-directional digital data communication over said WAN;
  a first LAN port for coupling to said LAN; and
  a first LAN modem coupled between said first LAN port and said WAN modem for bi-directional digital data communication over said LAN; and
 a first telephone apparatus comprising:
  a second LAN port for coupling to said LAN;
  a second LAN modem coupled to said LAN port for bi-directional digital data communication over said LAN with said gateway; and
  a converter coupled to said second LAN modem for converting between a digitized voice channel and analog voice signals,
wherein said gateway is operative for passing at least one digitized voice channel between said WAN port and said first LAN port, and said first telephone apparatus is operative for initiating and terminating telephone calls with a telephone service outside the building.

34. The system according to claim 33, wherein said WAN connects to the building using wiring, and said WAN port is a connector and said WAN modem is adapted to transmit and receive over said wiring.

35. The system according to claim 34, wherein said WAN is at least in part a Public Switched Telephone Network (PSTN), the wiring is a telephone wire pair connecting the building to the PSTN via a junction box, and said WAN modem is based on a Digital Subscriber Line (DSL) protocol.

36. The system according to claim 34, wherein said WAN is at least in part a Cable Television (CATV) network, the wiring is a coaxial cable connecting the building to the CATV network, and said WAN modem is a coaxial cable modem.

37. The system according to claim 33, wherein said LAN is based on wiring in the building, said first and second LAN ports are each a connector and said first and second LAN modems are each adapted to transmit and receive over said wiring.

38. The system according to claim 37, wherein the wiring is a telephone wire pair, and said first and second LAN modems are each a telephone line modem.

39. The system according to claim 33, wherein said gateway is further one of: a Cable Modem; a Set Top Box; and an ADSL modem, and said gateway further comprises a digital data connector for connecting to a Digital Terminal Equipment (DTE), for coupling digital data carried over said WAN to the DTE.

40. The system according to claim 33, wherein said first telephone apparatus comprises an analog telephone device and a subscriber line interface coupled between said second LAN modem and said analog telephone device.

41. The system according to claim 33, wherein said WAN is part of a network operated by a first service provider, and the telephone service is provided by a second service provider distinct from the first service provider.

42. The system according to claim 33, further comprising a second telephone apparatus, the second telephone apparatus comprising:
 a third LAN port for coupling to said LAN; and
 a third LAN modem coupled to said third LAN port for bi-directional digital data communication over said LAN with said gateway; and
 a second converter coupled to said third LAN modem for converting between a digitized voice channel and analog voice signals;
wherein said second telephone apparatus is operative for initiating and terminating telephone calls with a telephone service outside the building.

43. The system according to claim 42, further operative to support exchange/PBX-type features between said first and second telephone apparatuses.

44. The system according to claim 43, wherein said exchange/PBX-type features are at least one of: hold/call pick-up; call transfer; conference call; intercom; ringing all; repertory dialing; and memory dialing.

45. The system according to claim 43, wherein said exchange/PBX features include an intercom function, and wherein a telephone session can be executed between said first and second telephone apparatuses.

46. A network for coupling a plurality of analog telephone sets to a plurality of digitized telephone channels, said network comprising:
 a first telephone wire pair comprising at least two conductors and part of a local loop, said first telephone wire pair being connected to carry a first bi-directional serial digital data signal in a first digital data signal frequency band distinct from, and higher than, an analog telephone signal frequency band, the first digital data signal carrying first and second time-domain multiplexed digitized telephone channels;
 a second telephone wire pair at least in part in a wall of the building and comprising at least two conductors, said second telephone wire pair being connected to carry a second bi-directional serial digital data signal in a second digital data signal frequency band distinct from, and higher than, the analog telephone signal frequency band, the second digital data signal carrying the second digitized telephone channel;
 a first device coupled between said first and second telephone wire pairs and constructed to pass the second digitized telephone channel between said first and second telephone wire pairs, said first device being further connectable to a first analog telephone device for coupling the first digitized telephone channel, converted to analog telephony form, to the first analog telephone device; and
 a second device coupled to said second telephone wire pair, said second device being further connectable to a second analog telephone device for coupling the second digitized telephone channel, converted to analog telephony form, to the second analog telephone device.

47. The network according to claim 46, wherein said second telephone wire pair is connected to concurrently carry a first analog telephone signal in the analog telephone signal frequency band using frequency domain multiplexing, and wherein said second device is further operative to connect the first analog telephone signal to the second analog telephone device or another analog telephone device.

48. The network according to claim 46, wherein at least one of the first and second digital data signals is xDSL based.

49. The network according to claim 46, wherein at least one of said first and second devices is attached to a wall of a building, or is at least in part housed within an outlet, or is mechanically and electrically attached to a telephone outlet.

50. The network according to claim 46, wherein at least one of the first and second digitized telephone channels is pulse code modulated (PCM).

51. The network according to claim 46, wherein the first and second digitized telephone channels are provided by respective, distinct, first and second telephone service providers.

52. The network according to claim 46, wherein said first device is constructed to pass signals in the analog telephone signal frequency band between said first and second telephone wire pairs.

53. The network according to claim 46, wherein said first telephone wire pair is connected to concurrently carry a first analog telephone signal in said analog telephone signal frequency band using frequency domain multiplexing, and wherein said first device is further operative to connect said first analog telephone device or another analog telephone device to said first analog telephone signal.

54. The network according to claim 53, wherein said first device is constructed to pass the first analog telephone signal to the second telephone wire pair.

55. The network according to claim 46, wherein said second device is enclosed in a single enclosure that is constructed to have at least one of the following:
 a form substantially similar to that of a standard outlet;
 wall mounting elements substantially similar to those of a standard wall outlet;
 a shape allowing direct mounting in an outlet opening or cavity; and
 a form to at least in part substitute for a standard outlet.

56. A device for coupling a digitized telephone channel to an analog telephone set, for use with first and second telephone wire pairs, wherein the first telephone wire pair is at least part of a local loop outside of a building and comprises at least two conductors, and the first telephone wire pair is connected to carry a first bi-directional serial digital data signal in a first digital data signal frequency band distinct from, and higher than, an analog telephone signal frequency band, and the first digital data signal carries first and second time-domain multiplexed digitized telephone channels, wherein the second telephone wire pair is at least in part in a wall in the building and comprises at least two conductors, and the second telephone wire pair is connected to carry a second bi-directional serial digital data signal in a second digital data signal frequency band distinct from, and higher than, the analog telephone signal frequency band, and the second digital data signal carries the second digitized telephone channel, said device comprising:

- a first telephone connector connectable to the first telephone wire pair;
- a first transceiver coupled to said first telephone connector for transmitting and receiving the first bi-directional serial digital data over the first telephone wire pair;
- a second telephone connector connectable to the second telephone wire pair;
- a second transceiver coupled to said second telephone connector for transmitting and receiving the second bi-directional serial digital data over the second telephone wire pair;
- a third telephone connector connectable to an analog telephone set;
- a subscriber line interface coupled to said third telephone connector and constructed to conduct a telephone signal to and from the analog telephone set; and
- a single enclosure housing said connectors, said transceivers and said subscriber line interface,
- wherein said device is operative to pass the first digitized telephone channel between said first transceiver and said subscriber line interface for coupling the first digitized telephone channel to the analog telephone set, and wherein said device is further operative to pass the second digitized telephone channel between said first transceiver and said second transceiver, for passing the second digitized telephone channel between the first and second telephone wire pairs.

57. The device according to claim 56, further comprising a multiplexer having a first port coupled to said first transceiver, a second port coupled to said second transceiver and a third port coupled to said subscriber line interface, said multiplexer being constructed to pass the first digitized telephone channel between said first and third ports, and to pass the second digitized telephone channel between said first and second ports.

58. The device according to claim 56 wherein the first telephone wire pair is further connected to concurrently carry an analog telephone signal in the analog telephone signal frequency band, said device further comprising a high pass filter coupled between said first telephone connector and said first transceiver for substantially passing only signals in the first digital data signal frequency band.

59. The device according to claim 58, wherein said device is further constructed for coupling an analog telephone signal to the analog telephone set, said device further comprising:

- a third telephone connector connectable to the analog telephone set, a low pass filter coupled between said third telephone connector said first telephone connector for substantially passing only signals in the analog telephone frequency band.

60. The device according to claim 56, wherein the second telephone wire pair is connected to further concurrently carry an analog telephone signal in the analog telephone signal frequency band, the device further comprising a high pass filter coupled between said second telephone connector and said second transceiver for substantially passing only signals in the second digital data signal frequency band.

61. The device according to claim 60, wherein said device is further constructed for coupling an analog telephone signal to an analog telephone set, said device further comprising:

- a third telephone connector connectable to the analog telephone set, a low pass filter coupled between said third telephone connector and said second telephone connector for substantially passing only signals in the analog telephone frequency band.

62. The device according to claim 56, wherein the first bi-directional serial digital data signal is xDSL based and said first transceiver is a xDSL modem.

63. The device according to claim 56, wherein said device is attachable to a wall of a building, or is at least in part housed within an outlet, or is mechanically and electrically attached to a telephone outlet.

64. The device according to claim 56, wherein at least one of the first and second digitized telephone channels uses PCM (Pulse Code Modulation).

65. The device according to claim 56, wherein said device is constructed to pass signals in the analog telephone signal frequency band between said first and second telephone connectors for passing an analog telephone signal between the first and second telephone wire pairs.

66. The device according to claim 56, wherein said device is enclosed in a single enclosure that is constructed to have at least one of the following:

- a form substantially similar to that of a standard outlet;
- wall mounting elements substantially similar to those of a standard wall outlet;
- a shape allowing direct mounting in an outlet opening or cavity; and
- a form to at least in part substitute for a standard outlet.

* * * * *